US012680691B2

(12) United States Patent
Almajed et al.

(10) Patent No.: US 12,680,691 B2
(45) Date of Patent: Jul. 14, 2026

(54) SYSTEMS, DEVICES, AND METHODS FOR A BOILER HEALTH AND CARBON-FOOTPRINT MONITOR TOOL

(71) Applicant: SAUDI ARABIAN OIL COMPANY, Dhahran (SA)

(72) Inventors: Shaima Anwar Almajed, Dammam (SA); Mahendran Sella, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 677 days.

(21) Appl. No.: 18/061,043

(22) Filed: Dec. 2, 2022

(65) Prior Publication Data
US 2024/0183526 A1 Jun. 6, 2024

(51) Int. Cl.
*G06F 11/30* (2006.01)
*F22B 35/18* (2006.01)
*G01M 99/00* (2011.01)

(52) U.S. Cl.
CPC ........... *F22B 35/18* (2013.01); *G01M 99/005* (2013.01)

(58) Field of Classification Search
CPC ....................................................... F22B 35/18
See application file for complete search history.

(56) References Cited

U.S. PATENT DOCUMENTS

| | | | |
|---|---|---|---|
| 2007/0219730 A1 | 9/2007 | Lang | |
| 2008/0071501 A1 | 3/2008 | Herzog | |

FOREIGN PATENT DOCUMENTS

| | | |
|---|---|---|
| CN | 108205047 A | 6/2018 |
| CN | 101832543 A | 9/2020 |
| IN | L-2002-01140 A | 3/2006 |
| JP | 2008241220 A | 10/2008 |
| JP | 2015090252 A | 5/2015 |
| JP | 2016125802 A | 7/2016 |
| WO | 2010141242 A2 | 12/2010 |
| WO | 2019050726 A1 | 3/2019 |

OTHER PUBLICATIONS

SAER-11674, Boiler Health and Carbon Foot-Print Monitor, p. 1, Aug. 8, 2022.

*Primary Examiner* — Phuong Huynh
(74) *Attorney, Agent, or Firm* — Vorys, Sater, Seymour and Pease, LLP

(57) ABSTRACT
In some embodiments, a method includes generating a first indicator in response to a detection of fuel wastage of a boiler system based on a first comparison of data of a first set of data, generating a second indicator for monitoring a carbon footprint of the boiler system based on data of a second set of data, and generating at least one of a third indicator for monitoring tube-to-drum joints of the boiler system based on a second comparison of the data of the first set of data, a fourth indicator for monitoring tube overheating of the boiler system based on a third comparison of the data of the first set of data, or a fifth indicator for predicting flame disturbance of the boiler system based on a comparison of data of a third set of data.

15 Claims, 12 Drawing Sheets

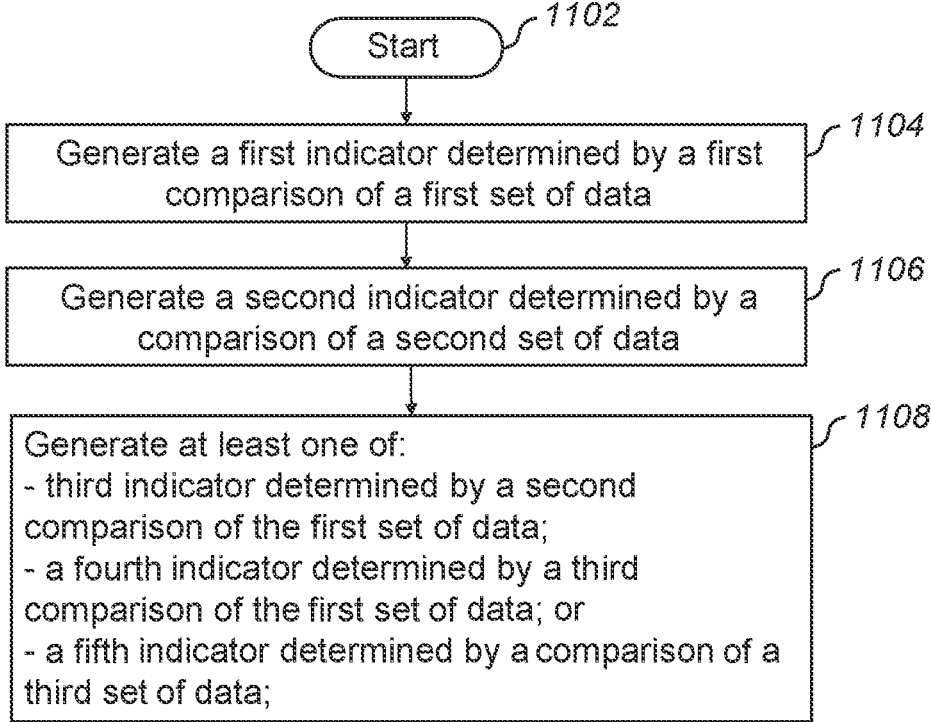

*1102*

Start

*1104*

Generate a first indicator determined by a first comparison of a first set of data

*1106*

Generate a second indicator determined by a comparison of a second set of data

*1108*

Generate at least one of:
- third indicator determined by a second comparison of the first set of data;
- a fourth indicator determined by a third comparison of the first set of data; or
- a fifth indicator determined by a comparison of a third set of data;

*FIG. 11*

SYSTEMS, DEVICES, AND METHODS FOR A BOILER HEALTH AND CARBON-FOOTPRINT MONITOR TOOL

FIELD OF THE DISCLOSURE

The present description relates generally to monitoring operations of boiler systems and, more particularly, to systems, devices and methods for providing a boiler health and carbon-footprint monitor tool for generating indicators that provide a status, real-time warnings with corrective actions, or a combination thereof, for one or more components of a boiler system.

BACKGROUND OF THE DISCLOSURE

Boiler systems, as used herein, collectively refer to the components of pressurized systems that burn fuels to generate hot water or steam. A boiler system includes multiple components, such as burners, firebox, convection section, economizer, super-heaters, pumps, exhaust stacks or flues, downcomers, risers, steam/mud drums that store the hot water, steam, or a combination thereof, sensors that monitor one or more of the multiple components and operational parameters of the boiler system, and a controls system that allows adjustment of operational settings of the boiler system. A power plant burns fossil fuels, such as coal, oil, or natural gas, to use the hot water or steam to generate electricity, for instance. As a result of burning fossil fuels, the boiler system may produce one or more by-products, such as carbon monoxide (CO), carbon dioxide ($CO_2$), methane ($CH_4$), nitrogen oxide ($NO_x$), or other greenhouse gases that are associated with a carbon footprint of the boiler system. High fuel consumption may lead to fuel wastage, an increased carbon footprint, increased $NO_x$ emissions, and long-term overheating of the boiler system while incomplete fuel combustion may lead to increased CO and $CH_4$ emissions.

To optimize energy extraction from the fuel and reduce greenhouse gas emissions, the boiler system should operate at high temperatures and burn the fuel continuously at a constant rate. To optimize efficiency of the boiler system, the boiler system should minimize undesirable by-products, such as ash, which can foul different components of the boiler system, and flue gas, which exits the boiler system and enters the environment. The goals of optimizing energy extraction and efficiency to reduce a carbon footprint of the boiler system present an operational challenge due to variability of operational parameters, such as fuel composition, fuel combustion, and reduced efficiency due to fouling, corrosion, erosion of metal, fatigue, or structural failures of one or more components during normal operations of the boiler system. The variability of operational parameters also increases a difficulty in predicting possible failures of one or more components and diagnosing root causes of decreased efficiency of the boiler system in real-time.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the purpose of this summary is to present some concepts of the disclosure in a simplified form prior to the more detailed description that is presented hereinafter.

According to an embodiment of the present disclosure, a boiler health and carbon-footprint monitor (BHCFM) tool, includes a fuel wastage engine, implemented by at least one processor, configured to generate a first indicator for monitoring fuel wastage of a boiler system based on a first comparison of data of a first set of data, a carbon footprint engine, implemented by the at least one processor, configured to generate a second indicator for monitoring a carbon footprint of the boiler system based on data of a second set of data, and at least one of: a cyclic load engine, implemented by the at least one processor, configured to generate a third indicator for monitoring tube-to-drum joints of the boiler system based on a second comparison of the data of the first set of data, or a load swing engine, implemented by the at least one processor, configured to generate a fourth indicator for monitoring tube overheating of the boiler system based on a third comparison of the data of the first set of data.

In another embodiment, a method for monitoring a boiler health and carbon footprint, includes generating a first indicator in response to a detection of fuel wastage of a boiler system based on a first comparison of data of a first set of data, generating a second indicator for monitoring a carbon footprint of the boiler system based on data of a second set of data, and generating at least one of: a third indicator for monitoring tube-to-drum joints of the boiler system based on a second comparison of the data of the first set of data, a fourth indicator for monitoring tube overheating of the boiler system based on a third comparison of the data of the first set of data, or a fifth indicator for predicting flame disturbance of the boiler system based on a comparison of data of a third set of data.

In another embodiment of the present disclosure, a non-transitory computer-readable medium stores computer-executable instructions, which, when executed by a processor, cause the processor to generate a first indicator in response to a detection of fuel wastage of a boiler system based on a first comparison of a first set of data, generate a second indicator for monitoring a carbon footprint of the boiler system based on a comparison of a data of a second set of data, and generate at least one of: a third indicator for monitoring tube-to-drum joints of the boiler system based on a second comparison of the data of the first set of data, a fourth indicator for monitoring tube overheating of the boiler system based on a third comparison of the data of the first set of data, or a fifth indicator for predicting flame disturbance of the boiler system based on a comparison of data of a third set of data.

Any combinations of the various embodiments and implementations described herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 11 is a flow diagram of a method for a BHCFM tool for generating indicators that provide a status, real-time warnings with corrective actions, or a combination thereof, for one or more components of a boiler system, in accordance with certain embodiments.

DETAILED DESCRIPTION

Figure 1:
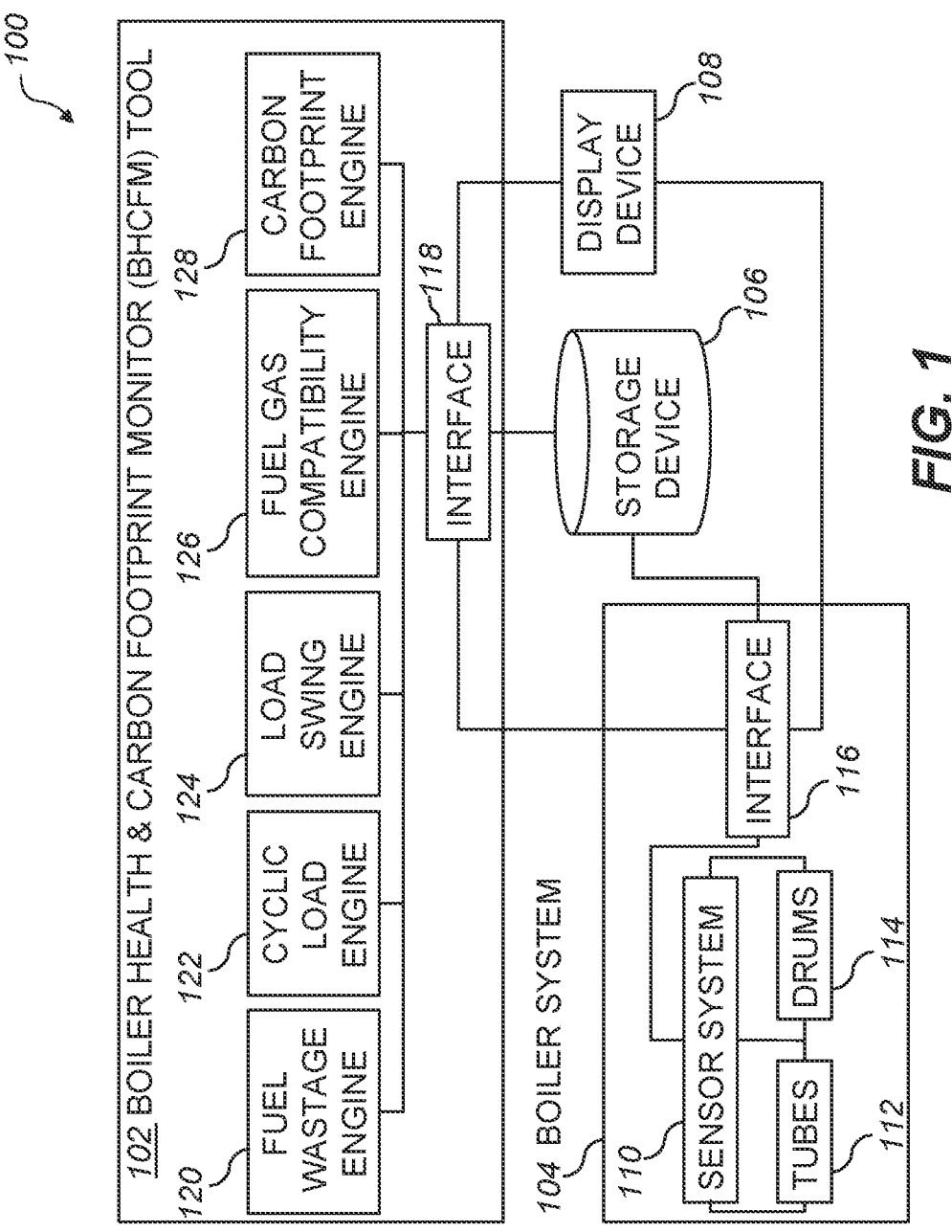
FIG. 1 is a block diagram of a system including a boiler health and carbon-footprint monitor (BHCFM) tool for generating indicators that provide a status, real-time warnings with corrective actions, or a combination thereof, for one or more components of a boiler system, in accordance with certain embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments described herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to monitoring operations of boiler systems and, more particularly, to systems, devices and methods for providing a boiler health and carbon-footprint monitor (BHCFM) tool. According to various embodiments, the BHCFM tool analyzes and manipulates real-time data of a boiler system to generate indicators that provide a status, real-time warnings with corrective actions, or a combination thereof, for one or more components and/or operational processes of the boiler system. In non-limiting examples, the BHCFM tool provides additional information related to the indicators that predict possible failures of one or more components and diagnose root causes of decreased efficiency of the boiler system in real-time. In non-limiting examples, the BHCFM tool determines different parameters that include, but are not limited to, a fuel wastage quantity, a thermal-cyclic loading, a number of rapid swing attempts, a fuel gas compatibility, a carbon footprint, an efficiency, an oxygen (O2) percentage, and a stack temperature, to provide real-time information that includes, but is not limited to, boiler integrity, boiler reliability, carbonization levels, and environmental conservation levels. By automating analysis of the real-time data of the boiler system, the BHCFM tool enhances energy extraction from a fuel, enhances efficiency by reducing undesirable by-products, enables prediction of failures of one or more components, and diagnoses root causes of decreased efficiency of the boiler system. By generating indicators that provide warnings as well as operational information, the BHCFM tool enhances a safety and a reliability of operations of the boiler system. The warnings and operational information of the BHCFM tool reduce a downtime and cost for repair, which can exceed half a million dollars when unplanned, by identifying failures before they happen and preventing cascading failures that cause damage to other components of the boiler system. The warnings and operational information of the BHCFM tool also reduce a downtime for repair by identifying root causes, thereby eliminating a manual search of the boiler system for an operational failure. The BHCFM tool extends a lifetime of one or more components of the boiler system by facilitating repairs and preventing damage to other components.

FIG. 1 is a block diagram of a system 100 including a BHCFM tool 102, in accordance with certain embodiments. In a non-limiting example, the system 100 includes the BHCFM tool 102 for generating indicators that provide a status, real-time warnings with corrective actions, or a combination thereof, for one or more components and/or operational processes of a boiler system 104. In a non-limiting example, the system 100 includes one or more systems, as described with respect to FIG. 12, that communicate via a combination of local and remote networks, such as in a distributed system that is hosted, completely or in part, in the cloud. In a non-limiting example, the system 100 includes the boiler system 104, which may include multiple systems as described with respect to FIG. 12, and another system that hosts the BHCFM tool 102 in the cloud. The BHCFM tool 102 may be implemented by a computer system such as described with respect to FIG. 12. Hosting the BHCFM tool 102 in the cloud enables multiple remote facilities each having one or more boiler system 104 to utilize the BHCFM tool 102 for generating indicators that provide a status, real-time warnings with corrective actions, or a combination thereof, for one or more components of each of the one or more boiler system 104. The multiple remote facilities may be owned or operated by the same organization or by one or more different organizations. The BHCFM tool 102 may be owned or operated by a same organization that owns or operates the boiler system 104 or may be owned by a different organization.

As described herein, the boiler system 104 includes multiple components, such as burners, combustion chambers, heat exchangers, heaters, super-heaters, pumps, exhaust stacks or flues, lines or tubes 112 that circulate the fuel or hot water or steam, drums 114 that store a water, steam, or a combination thereof, sensors (e.g., sensor system 110) that monitor one or more of the multiple components and operational parameters of the boiler system 104, and a controls system that allows adjustment of operational settings of the boiler system 104. While not explicitly shown, each of the multiple components of the boiler system 104 may couple to one or more sensors of the sensor system 110. The sensor system 110 may include multiple types of sensors, such as temperature gauges, flow meters, pressure sensors, image sensors, water detection sensors, acoustic sensors, or other suitable sensors for collecting operational data of one or more components of the boiler system 104. The sensor system 110 may be configured to collect, store, transmit, or a combination thereof, data at specified intervals, as a matter of course or in response to specified events (e.g., boiler efficiency is below a threshold limit, oxygen analyzer reading drops below a threshold amount), or a combination thereof. Based on data collected by the sensor system 110, the BHCFM tool 102 generates indicators that provide a status, real-time warnings with corrective actions, or a combination thereof, for one or more components of the boiler system 104.

In various non-limiting examples, the data collected by the sensor system 110 is retrieved by the BHCFM tool 102 from a storage device 106. The storage device 106 is a computer-readable media, such as described with respect to FIG. 12, for example. In other non-limiting examples, the data collected by the sensor system 110 is transmitted by the boiler system 104 via an interface 116 to the BHCFM tool 102, which receives the data via an interface 118. The interface 116, 118 may be a computer system, an input device or a network interface, as described with respect to FIG. 12, for example. In a non-limiting example, the interface 116 is a computer system that includes an input device, a network interface, and a browser or other suitable computer application that enables a user to connect to the BHCFM tool 102 via a network. In a non-limiting example, the interface 118 is an application programming interface server that receives the data collected by the sensor system 110 via a web application accessible via the interface 116. In various embodiments, one or more outputs (e.g., indicators, operational information, predicted failures, root cause analysis) of the BHCFM tool 102 is stored to the storage device 106 to provide data on operations of the boiler system 104 for users having a specified authorization to access the data. In a non-limiting example, the output of the BHCFM tool 102 is viewable via a display device 108. The display device 108 may be an output device as described with respect to FIG. 12, for example. The display device 108 may be a display device of the boiler system 104, a system including the BHCFM tool 102, or another system having a specified authorization to access the output, for example.

In accordance with various embodiments, within the BHCFM tool 102, an interface 118 receives, or retrieves, the data collected by the sensor system 110 for processing by one or more of a fuel wastage engine 120, a cyclic load engine 122, a load swing engine 124, a fuel gas compatibility engine 126, or a carbon footprint engine 128. The BHCFM tool 102 may receive, or retrieve, the data collected by the sensor system 110 as one or more sets of data. For example, a set of data may be associated with a specified boiler identifier, a specified owner/operator identifier, or a combination thereof, for a specified period. The specified period may be real-time, a most recent window of time, such as a most recent 10-minute, 15-minute, 30-minute, 1-hour window or other suitable window specified by a user of the BHCFM tool 102. The set of data may include one or more subsets of data aggregated by sub-system of the boiler system 104, components of the boiler system 104 having a same type (e.g., tubes, drums, heaters), a type of a sensor reading (e.g., temperature, pressure, British Thermal Unit (BTU), flow per minute (FPM), standard cubic feet per hour (SCFH), pounds per hour (lbs/hr, or lbh)), a window of time, or other categorization specified by a user of the BHCFM tool 102 or an owner/operator of the boiler system 104.

In non-limiting examples, the fuel wastage engine 120 is configured to detect a heat duty mismatch based on data from flow meters and throughput of the boiler system 104 and to generate an indicator that notifies a user when fuel wastage is present in the boiler system 104. The cyclic load engine 122 is configured to count a number of thermal cycles during a time period and generate an indicator that notifies a user of a cyclic load status of the boiler system 104. The load swing engine 124 is configured to track a number of rapid ramp up attempts within a time period and generate an indicator that notifies a user of a tube status of the boiler system 104. A rapid ramp up attempt, as used herein, occurs when a rate of change of a maximum continuous rating (MCR) percentage (MCR %) increases by more than a threshold rate. In a non-limiting example, the load swing engine 124 is configured to generate an indicator in response to the rate of change of the MCR % exceeding a threshold rate of 10% per minute (10%/min). In other non-limiting examples, the threshold rate is 5%/min, 7.5%/min, 9.5%/min, 10.5% min, or another specified threshold rate. The specified threshold rate may be determined by one or more manufacturing specifications of the boiler system 104 or an owner or operator of the boiler system 104, for example. The fuel gas compatibility engine 126 is configured to determine a compatibility index and generate an indicator for predicting flame disturbance of the boiler system 104. The carbon footprint engine 128 is configured to determine a carbon emissions of the boiler system 104 and generate an indicator that notifies a user of the carbon footprint of the boiler system 104 in real time.

In non-limiting examples, the fuel wastage engine 120 is configured to monitor fuel wastage of the boiler system 104 by detecting a heat duty mismatch based on data from flow meters and throughput of the boiler system 104. The fuel wastage engine 120 is configured to detect the heat duty mismatch by comparing a burner heat duty and an enthalpy absorbed, for example. In a non-limiting example, the fuel wastage engine 120 is configured to determine one or more root causes of the fuel wastage and generate a report including the root causes. For example, the fuel wastage engine 120 is configured to diagnose incomplete fuel combustion, failure of one or more flow meters, improper air flow, improper burner settings, scale growth, or a combination thereof. In a non-limiting example, the fuel wastage engine 120 is configured to determine root causes by detecting variations in air-to-fuel ratios based on a comparison of air flow and oxygen content, by comparing a stack temperature to a threshold stack temperature, by comparing a super-heater temperature to a threshold super-heater temperature, or a combination thereof. The threshold stack temperature, the threshold super-heater temperature, or a combination thereof, may be determined using one or more manufacturing specifications associated with the stack or super-heater, respectively, or may be determined by an owner/operator of the boiler system 104, for example. By detecting fuel wastage, the fuel wastage engine 120 of the BHCFM tool 102 enables a reduction in fuel consumption of the boiler system 104, a reduction in a carbon footprint of the boiler system 104, and a reduction in a risk of long-term overheating of one or more components of the boiler system 104.

Table 1 shows a non-limiting example of an output that the fuel wastage engine 120 is configured to generate. Table 1 includes data range, score, duration, and warnings/recommendations fields. The data range shows the days with which an entry is associated and the duration shows a duration in days, hours, minutes, and seconds associated with the entry. The fuel wastage engine 120 is configured to determine the score by calculating an amount of deviation between an actual fuel gas wastage and a specified design value. The specified design value may be determined by a manufacturer of the boiler system 104 or by an owner/operator of the boiler system 104, for example. In a non-limiting example, the score is the amount of deviation above or below the specified design value as a percentage. The fuel wastage engine 120 is configured to generate the warnings/recommendations in response to detecting the heat duty mismatch.

TABLE 1

Warnings and Recommendations of Fuel Wastage Engine

| Date Range | Score | Duration | Warnings/Recommendations |
|---|---|---|---|
| Jan. 31, 2022-Feb. 3, 2022 | −9.792 | 2 d 22:46:31 | 2 - Adjust air to fuel ratio |
| Feb. 3, 2022-Feb. 4, 2022 | −9.267 | 1 d 09:10:48 | 1 - Recalibrate the fuel flow meter. If flow meter is calibrated, go to step 2.<br>2 - Adjust the air to fuel ratio. |
| Feb. 4, 2022-Feb. 5, 2022 | 5.4805 | 01:16:37 | 1 - Verify flame shape/stability. If the shape is outside parameters, adjust burner, otherwise go to step 2.<br>2 - Verify if stack temperature exceeds threshold stack temperature. If the stack temperature is normal, then re-calibrate flow meters, otherwise go to step 3.<br>3 - Verify if super-heater temperature exceeds threshold super-heater temperature. If the super-heater temperature is normal, then re-calibrate flow meters, otherwise perform scale density test. |

In non-limiting examples, the cyclic load engine 122 is configured to monitor tube-to-drum joints of the boiler system 104 based on a number of thermal cycles that occur during a time period. In a non-limiting example, the cyclic load engine 122 is configured to compare a duration of a thermal cycle to a specified window to determine a number of cold cycles, a number of hot cycles, or a combination thereof, to determine an operational condition of one or more tube-to-drum joints of the boiler system 104. A hot cycle, as used herein, is a duration between a shut down and a subsequent start up that is less than a specified number of hours. A cold cycle, as used herein, is a duration between a shut down and a subsequent start up that is greater than the specified number of hours. The specified number of hours may be 5 hours, for example. In other non-limiting examples, the specified number of hours may be specified by a manufacturing specification for one or more components of the boiler system or operating guidelines of an owner/operator of the boiler system. The operational conditional is used to predict a compromise of the integrity of one or more tube-to-drum joints during normal operations or hydro-testing (e.g., stress testing) of the boiler system 104, for example. By detecting thermal cycles and reporting the number of cold cycles and the number of hot cycles, the cyclic load engine 122 of the BHCFM tool 102 prevents failures of tube-to-drum joints of the boiler system 104, or to other components of the boiler system 104 that are susceptible to leakage if subjected to severe thermal cycling.

Table 2 shows a non-limiting example of an output that the cyclic load engine 122 is configured to generate. Table 2 includes types of cycles and count fields for a data range. The date range may be selected by a user, as described with respect to FIG. 5, for example.

TABLE 2

Thermal Cycles Detected by Cyclic Load Engine

| Type of Cycle | Count |
|---|---|
| Number of cycles | 180 |
| Hot cycles identified | 110 |
| Cold cycles identified | 70 |

In non-limiting examples, the load swing engine 124 is configured to monitor overheating of the boiler system 104 by tracking a number of rapid ramp up attempts within a time period and generating an indicator that notifies a user of a tube status of the boiler system 104. In a non-limiting example, the load swing engine 124 is configured to compare a duration of a rapid ramp up attempt to a time window to determine an operational condition for one or more tubes of the boiler system 104. The operational condition is used to diagnose a failure of one or more components of the boiler system 104 based on a result of the comparison, for example. By detecting the rapid ramp up attempts, reporting the number of rapid ramp up attempts, and reporting failures of one or more flow meters, the load swing engine 124 of the BHCFM tool 102 prevents failures of tubes of the boiler system 104, or to other components of the boiler system 104 that are susceptible to overheating.

Table 3 shows a non-limiting example of an output that the load swing engine 124 is configured to generate. Table 2 includes data range, duration, and "plant" fuel gas MCR % change maximum fields, where "plant" indicates a type of plant including the boiler system 104, for example. In a non-limiting example, the plant may be a Berri Gas Plant (BGP) used to test the logics during a pilot program. In other non-limiting examples, the plant is one of multiple operational plants owned or operated by an organization. The data range shows the days with which an entry is associated and the duration shows a duration in days, hours, minutes, and seconds associated with the entry. The BGP fuel gas MCR % change maximum field identifies a maximum change of the MCR % detected by the load swing engine 124. The maximum change of the MCR % fuel gas flow quantity is determined by calculating a percentage that the fuel gas rises or falls within a specified period of time. In a non-limiting example, the specified period of time is a minute, and the percentage is determined using the following equation:

$$MCR \% = (\text{final fuel flow} - \text{initial fuel flow}) * 100 / (\text{initial fuel flow}),$$

where the initial fuel flow and the final fuel flow are readings of a fuel gas flow meter taken immediately prior to the specified period of time and immediately after the specified period of time.

TABLE 3

Warnings and Recommendations of Fuel Wastage Engine

| Date Range | Duration | BGP Fuel Gas MCR % Change Maximum |
|---|---|---|
| Jan. 31, 2022-Feb. 3, 2022 | 2 d 22:46:31 | 2.0028 |
| Feb. 3, 2022-Feb. 4, 2022 | 1 d 09:10:48 | 2.1293 |

In non-limiting examples, the fuel gas compatibility engine 126 is configured to predict flame disturbance of the boiler system 104 by calculating a compatibility index for a new fuel composition and comparing the compatibility index to a lower heating value (LHV) for a current fuel composition. The new fuel composition is to replace a current fuel composition in use by the boiler system 104, for example. In a non-limiting example, the fuel gas compatibility engine 126 is configured to calculate a Wobbe index for each of the new fuel composition and the current fuel composition. The fuel gas compatibility engine 126 is configured to use a Wobbe Index ($W_I$) equation:

$$W_I = \frac{HHV}{\sqrt{SG}},$$

where HHV is a higher heating value and SG is a specific gravity, for example. The HHV may be determined by fuel gas analysis, which determines an amount of heat released by a specified quantity of fuel once combusted and accounts for a latent heat of vaporization of water in the combustion products. The fuel gas compatibility engine 126 is configured to compare the Wobbe index for the new fuel composition to the LHV of the Wobbe index for the current fuel composition and to generate one or more recommendations based on a result of the comparison. The recommendations include, but are not limited to, a recommendation to change the new fuel composition, the current fuel composition, a fuel gas line size, a burner tip, or a combination thereof. By performing the comparison, the fuel gas compatibility engine 126 of the BHCFM tool 102 verifies that a calorific value and volumetric flow rate of the new fuel composition maintains a burner heat duty currently supported by the boiler system. By predicting a flame disturbance and generating recommendations, the fuel gas compatibility engine 126 of the BHCFM tool 102 prevents or reduces incomplete combustion, reduces fuel wastage, increases energy efficiency, or a combination thereof.

In non-limiting examples, the carbon footprint engine 128 is configured to monitor a carbon footprint of the boiler system 104 by determining a carbon emissions of the boiler system 104. In a non-limiting example, the carbon footprint engine 128 is configured to determine the carbon emissions using an actual fuel composition and a real-time firing rate of the boiler system 104. By using the actual fuel composition and real-time firing rate, the carbon footprint engine 128 generates a real-time indicator of a carbon footprint of the boiler system 104, which may be used to inform operational decisions, such as whether to modify a fuel composition or improve an efficiency of the boiler system 104 by replacing one or more components. In a non-limiting example, the carbon footprint engine 128 uses data of a BTU analyzer to generate an indicator that indicates an instantaneous $CO_2$ produced in klbs per hour (klbs/hr). The instantaneous $CO_2$ produced in klbs per hour (klbs/hr) may be calculated according to the American Petroleum Institute (API) 560 standard or a like standard. By determining the instantaneous $CO_2$, the carbon footprint engine 128 also enables cumulative reporting over time.

Figure 2:
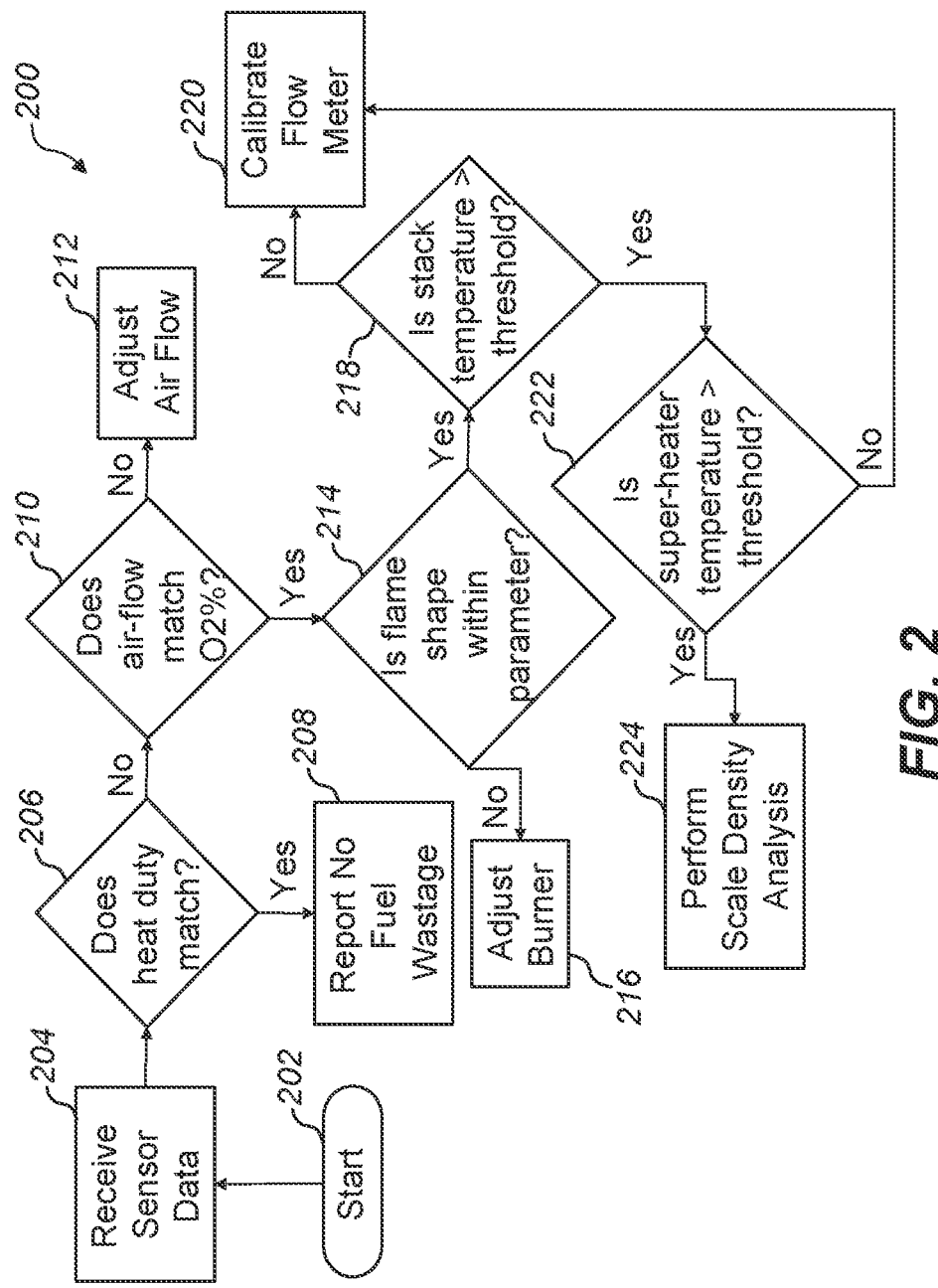
FIG. 2 is a flow diagram of a method for detecting fuel wastage of a boiler system by a BHCFM tool, in accordance with certain embodiments.

FIG. 2 is a flow diagram of a method 200 for detecting fuel wastage of a boiler system by a BHCFM tool, in accordance with certain embodiments. In a non-limiting example, the method 200 is used by a BHCFM tool for generating indicators that provide a status, real-time warnings with corrective actions, or a combination thereof, for one or more components of a boiler system. The method 200 is used by a fuel wastage engine of the BHCFM tool as described with respect to FIG. 1 or 11, for example. The method 200 includes starting (block 202), receiving sensor data (block 204), determining whether the data indicates a heat duty mismatch (block 206), and in response to an indication that a heat duty mismatch is not detected, generating an indicator that indicates no fuel wastage is detected (block 208). In response to an indication that a heat duty mismatch is detected at block 206, the method 200 includes determining whether an airflow mismatch is detected (block 210). In response to an indication that an airflow mismatch is not detected at block 210, the method 200 also includes generating a recommendation to adjust one or more air flows of the boiler system (block 212). Additionally, in response to an indication that an airflow mismatch is detected at block 210, the method 200 includes determining whether a flame shape is within parameter (block 214). In response to a determination that the flame shape is not within (e.g., outside) parameter at block 214, the method 200 includes generating a recommendation to adjust one or more burners of the boiler system (block 216). In response to a determination that the flame shape is within parameter at block 214, the method 200 also includes determining whether a stack temperature exceeds a threshold stack temperature (block 218). Additionally, in response to a determination that the stack temperature is equivalent to or less than the threshold stack temperature at block 218, the method 200 includes generating a recommendation to calibrate one or more flow meters of the boiler system (block 220). In response to a determination that the stack temperature exceeds the threshold stack temperature at block 218, the method 200 includes determining whether a super-heater temperature exceeds a threshold super-heater temperature (block 222). In response to a determination that the super-heater temperature is equivalent to or less than the threshold super-heater temperature at block 222, the method 200 also includes generating a recommendation to calibrate one or more flow meters of the boiler system (block 220). In response to a determination that the super-heater temperature exceeds the threshold super-heater temperature at block 222, the method 200 also includes generating a recommendation to perform a scale density analysis of one or more components of the boiler system (block 224).

Starting block 202 includes, but is not limited to, receiving an input from a user, the present system, another system, or a combination thereof, that indicates the present system is to perform the method 200. In a non-limiting example, receiving the sensor data at block 204 includes, but is not limited to receiving the sensor data from one or more computer-readable medium, input devices, network interfaces, or a combination thereof, associated with the present system, another system, or a combination thereof. In a non-limiting example, receiving the sensor data at block 204 includes filtering the sensor data to identify a set of data used by a fuel wastage engine of the BHCFM tool. For example, the method 200 may include identifying one or more sets of data of the sensor data that includes one or more flow meter data received by a distributed control system (DCS) of a boiler system, such as fuel flow or steam flow through one or more components of the boiler system, and corresponding process throughput, one or more oxygen analyzer readings and corresponding air flow meter data, one or more stack temperatures, one or more super-heater temperatures, or a combination thereof.

In a non-limiting example, determining whether the data indicates a heat duty mismatch at block 206 includes, but is not limited to, comparing flow meter data to corresponding process throughput, determining a fuel wastage percentage, or a combination thereof. The flow meter data may be a burner heat duty and the corresponding process throughput may be used to determine an enthalpy absorbed by the boiler system, for example. In a non-limiting example, in response to a result of the comparison indicating that the heat duty is within a specified threshold tolerance range, an indicator is generated indicating that no heat duty mismatch is detected, and in a response to the result of the comparison indicating that the heat duty is outside the specified threshold tolerance range, an indicator is generated indicating that a heat duty mismatch is detected. The specified threshold tolerance range may be a range, such as +/−a specified percentage, that is specified by a manufacturer, an owner, or an operator of the boiler system. In a non-limiting example, in response to the fuel wastage percentage exceeding +/−2.0%, a heat duty mismatch is indicated at block 206. The indicator and the fuel wastage percentages may be outputs of the block 206, for example. In a non-limiting example, in response to an indication that a heat duty mismatch is not detected at block 206, generating the indicator that indicates no fuel wastage is detected at block 208 includes generating a report including one or more of the data associated with block 204, 206.

In a non-limiting example, in response to an indication that a heat duty mismatch is detected, determining whether an airflow mismatch is detected at block 210 includes comparing oxygen analyzer data to corresponding air flow meter data. The comparison detects variations in air-to-fuel ratio, for example. In a non-limiting example, in response to the comparison indicating that the air-to-fuel ratio is within a specified threshold tolerance range, an indicator is generated indicating that no airflow mismatch is detected, and in a response to the comparison indicating that the air-to-fuel ratio is outside the specified threshold tolerance range, an indicator is generated indicating that an airflow mismatch is detected. The specified threshold tolerance may be a range, such as +/−a specified percentage, that is specified by a manufacturer, an owner, or an operator of the boiler system. The indicator may be an output of the block 210, for example. In a non-limiting example, in response to an indication that an airflow mismatch is not detected at block 210, generating the recommendation to adjust one or more air flows of the boiler system at block 212 includes generating a report that includes recommendations to adjust one or more air registers associated with the air flow data, one or more of the data associated with block 204, 206, 210, or a combination thereof.

In a non-limiting example, in response to an indication that an airflow mismatch is detected at block 210, determining whether a flame shape is within parameter at block 214 includes generating a prompt for a user to visually confirm a shape, a size, or a combination thereof, of one or more flames. The prompt may include a visual aid that shows, describes, or a combination thereof, the shape, the size, or the combination thereof. The prompt may include one or more graphical user inputs, such as a button to click or a data field in which to enter data, that enables the user to confirm the shape, the size, or the combination thereof. In response to the user data, an indicator is generated indicating whether the flame shape is within parameter. The indicator may be an output of the block 214, for example. In a non-limiting example, in response to an indication that flame shape is outside parameter at block 214, generating the recommendation to adjust one or more burners of the boiler system at block 216 includes generating a report that recommends regulating an air flow to the one or more burners, cleaning a tip of the one or more burners, adjusting a tip of the one or more burners, one or more of the data used in block 206, 210, 214, or a combination thereof.

In a non-limiting example, in response to a determination that the flame shape is within parameter at block 214, determining whether a stack temperature exceeds a threshold stack temperature at block 218 includes generating an indicator that indicates whether the stack temperature exceeds the threshold stack temperature. The indicator may be an output of the block 218, for example. In response to a determination that the stack temperature is equivalent to or less than the threshold stack temperature at block 218, generating a recommendation to calibrate one or more flow meters of the boiler system at block 220 includes generating a report that recommends re-calibrating one or more fuel flows, air flows, or a combination thereof, one or more of the data used in block 206, 210, 214, 218, or a combination thereof.

In a non-limiting example, in response to a determination that the stack temperature exceeds the threshold stack temperature at block 218, determining whether a super-heater temperature exceeds a threshold super-heater temperature at block 222 includes generating an indicator that indicates whether the stack temperature exceeds the threshold stack temperature. The indicator may be an output of the block 222, for example. In response to a determination that the super-heater temperature is equivalent to or less than the threshold stack temperature at block 222, generating a recommendation to calibrate one or more flow meters of the boiler system at block 220 includes generating a report that includes a recommendation to re-calibrate one or more fuel flows, air flows, or a combination thereof, one or more of the data used in block 206, 210, 214, 218, 222, or a combination thereof. In a non-limiting example, in response to a determination that the super-heater temperature exceeds the threshold super-heater temperature at block 222, generating a recommendation to perform a scale density analysis of one or more components of the boiler system at block 224 includes generating a report that includes a recommendation to perform a scale density analysis of one or more tubes of a furnace of the boiler system, one or more of the data used in block 206, 210, 214, 218, 222, or a combination thereof.

In a non-limiting example, the method 200 includes generating a table that includes one or more indicators, conclusions/warnings/recommendations, or a combination thereof. The method 200 generates Table 4a and 4b, herein referred to collectively as Table 4, for example. Table 4a shows each indicator and conditional parameters that may be associated with each indicator, as determined using the method 200, for example. Each indicator, along with any associated conditional parameters, is assigned a number 1 through 14.

TABLE 4a

| Conclusions/Warnings/Recommendations of BHCFM Tool | | | | | |
|---|---|---|---|---|---|
| | | Conditional Parameters | | | |
| Indicator | | Fuel vs. MCR % | Air vs. MCR % | 02% vs. MCR % | Other Indicators |
| 1 | Stack Temp Low | H | | | |
| 2 | (SET-L) | | | | |
| 3 | Fuel Wastage [+]ve | H | H | | |
| 4 | (FW-P) | H | | L | |
| 5 | Fuel Wastage [−]ve | L | | H | |
| 6 | (FW-N) | L | | | |
| 7 | Stack Temperature High | H | H | | SHT-H |
| 8 | (SET-H) | | | | SHT-H |
| 9 | | | H | H | SHT-H |
| 10 | SH Temperature High | H | H | | FW-P |
| 11 | (SHT-H) | | | | |
| 12 | | | H | H | |
| 13 | SH Temperature Low | | | | FW-N |
| 14 | (SHT-L) | L | | H | |

The numbers 1 through 14 are used in Table 4b to associate one or more conclusions, warnings, or recommendations with a respective indicator and its associated conditional parameter of Table 4a. In a non-limiting example, the conclusions/warnings/recommendations associated with an indicator include one or more conclusions, warnings, or recommendations associated with an air-fuel flow ratio (e.g., Airflow), one or more instruments of the boiler system (e.g., Instrument Fault), one or more locations that may include scale (e.g., Scale Presence), a gas composition (e.g., Gas Comp.), flow of water for one or more desuperheaters (DSH) (e.g., DSH Water), or condition of one or more of the burner tips (e.g., Burner Tips).

TABLE 4b

| Conclusions/Warnings/Recommendations of BHCFM Tool continued | | | | | | |
|---|---|---|---|---|---|---|
| | | Conclusions/Warnings/Recommendations | | | | |
| Indicator | Airflow | Instrument Fault | Scale Presence | Gas Comp. | DSH Water | Burner Tips |
| 1 | Add Air | Fix O2 Analyzer | | | | |
| 2 | | Fix Temp. Sensor | | Leaner Gas | | |
| 3 | Reduce Fuel | Fix Fuel Meter | Clean Furnace Tubes | | | Replace Eroded Tips |
| 4 | Reduce Fuel | | Clean Furnace Tubes | | | |
| 5 | Add Fuel | | | | | Clean Plugged Tips |
| 6 | Add Fuel | Fix Fuel Meter | | | | |
| 7 | | | Clean Furnace Tubes | | | Replace Eroded Tips |
| 8 | Reduce Air | | | | | |
| 9 | | | | Richer Gas | | |
| 10 | | | Clean Furnace Tubes | | Water Blocked | Replace Eroded Tips |
| 11 | | | | Richer Gas | | |
| 12 | Reduce Air | | | | | |
| 13 | | | Clean Super-heater Tubes | Leaner Gas | Excess Water Spray | |
| 14 | Add Fuel | | Clean Super-heater Tubes | Leaner Gas | | Clean Plugged Tips |

Figure 3:
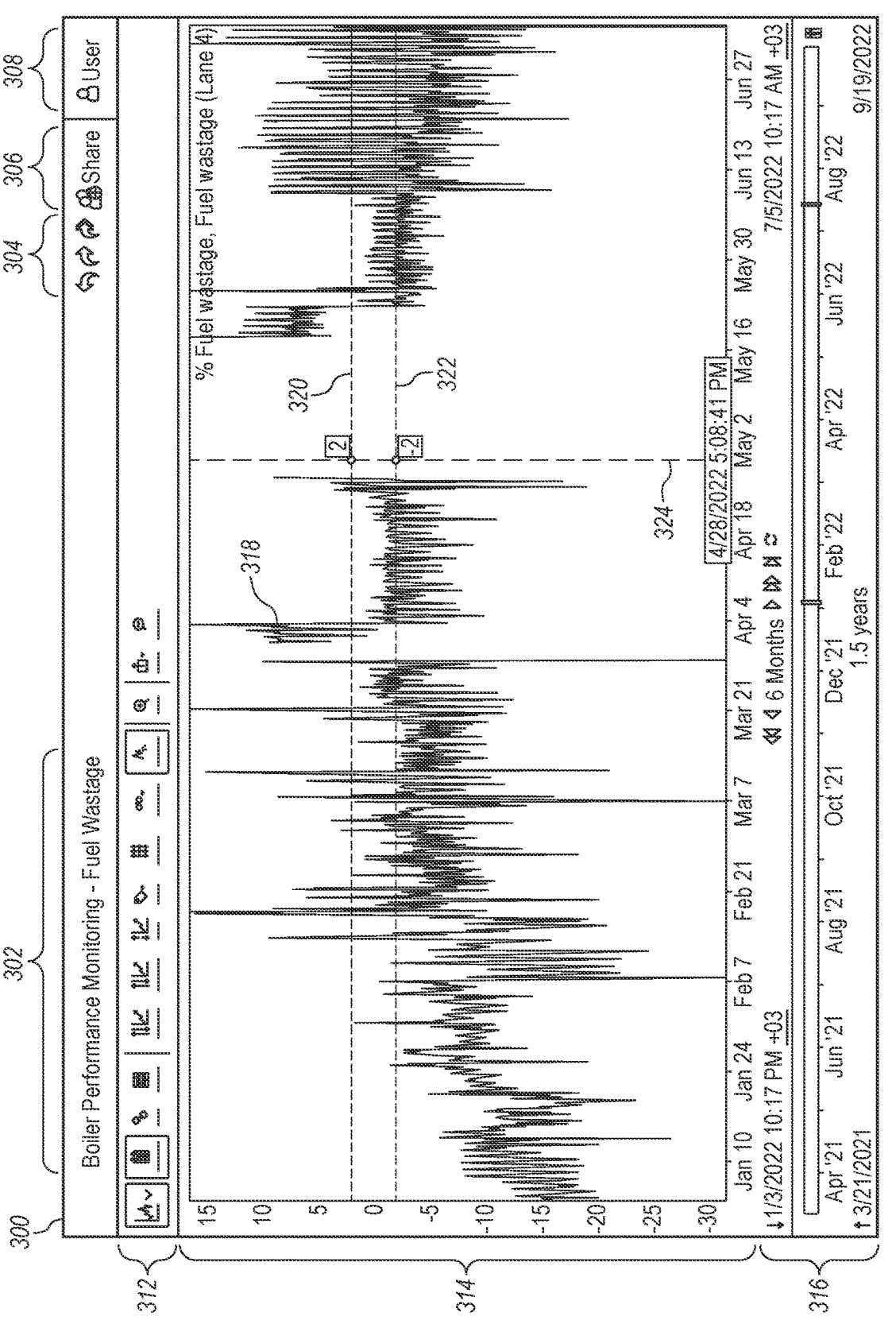
FIG. 3 is a timing diagram of an example output of a BHCFM tool detecting fuel wastage of a boiler system, in accordance with certain embodiments.

FIG. 3 is a timing diagram 318 of an example output of a BHCFM tool for detecting fuel wastage of a boiler system, in accordance with certain embodiments. In a non-limiting example, the timing diagram 318 is generated by a fuel wastage engine of the BHCFM tool as described with respect to FIG. 1, 2, or 11, for example. The timing diagram 318 is displayed in a digital dashboard 300, for example. The digital dashboard 300 is an example graphical user interface generated by the BHCFM tool. In a non-limiting example, the digital dashboard 300 is generated by the BHCFM tool and displayed to a display device, as described with respect to FIG. 1. The digital dashboard 300 includes a title 302 that identifies information displayed within an area 314, for example. The digital dashboard 300 may include one or more of navigational interfaces 304 that enables a user to display information other than shown within the area 314, a share interface 306 that enables the user to share information with other users, a user indicator 308 that identifies a current user of the digital dashboard 300, a menu 312 that enables the user to manipulate the information within the area 314, or a timeline interface 316 that enables the user to specify a time period for which to display information within the area 314.

In a non-limiting example, the user may select a time period for which to display a percentage of fuel wastage using the timeline interface 316. In response to the selection, the BHCFM tool may retrieve an output of the fuel wastage engine that includes a percentage of fuel wastage for each day of the specified time period selected using the timeline interface 316. The BHCFM tool may generate a graphical representation of the output as the timing diagram 318 within the area 314, for example. The timing diagram 318 shows a percentage of fuel wastage for the specified time period. The BHCFM tool may include reference lines 320, 322, 324. The reference lines 320, 322 may indicate an upper limit of a threshold and a lower limit of a specified threshold tolerance range, respectively. The reference line 324 may indicate a point of interest selected by a user of the BHCFM tool. For example, the reference line 324 indicates the user is interested in data associated with a time of 5:08:41 PM on Apr. 28, 2022. In a non-limiting example, in response to a user selection of a menu option of the menu bar 312 that enables the user to view data generated by the fuel wastage engine of the BHCFM tool, a table displays within the area 314. The table may be a table summarizing one or more outputs of one or more methods used by the fuel wastage engine of the BHCFM tool. The one or more methods used by the BHCFM tool may be the method 200, for example. The table may include data fields of Table 1, as described with respect to FIG. 1, for example.

Figure 4:
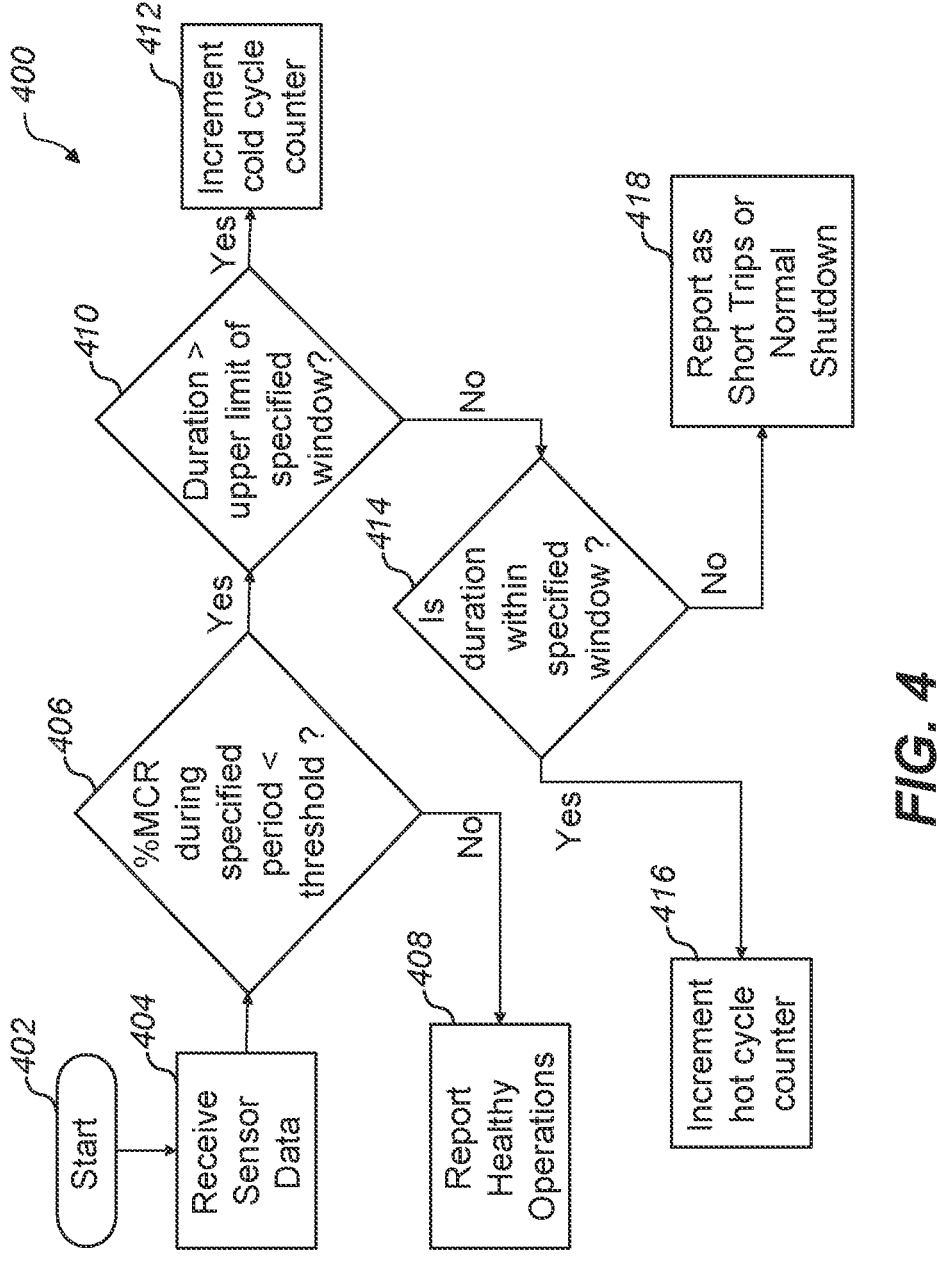
FIG. 4 is a flow diagram of a method for monitoring tube-to-drum joints of a boiler system by a BHCFM tool, in accordance with certain embodiments.

FIG. 4 is a flow diagram of a method 400 for monitoring tube-to-drum joints of a boiler system by a BHCFM tool, in accordance with certain embodiments. In a non-limiting example, the method 400 is used by a BHCFM tool for generating indicators that provide a status, real-time warnings with corrective actions, or a combination thereof, for one or more components of a boiler system. The method 400 is used by a cyclic load engine of the BHCFM tool as described with respect to FIG. 1 or 11, for example. The method 400 includes starting (block 402), receiving sensor data (block 404), determining whether the data indicates that an MCR % is less than a threshold level during a specified period (block 406), and in response to an indication that the MCR % is equivalent to or above the threshold level during the specified period, generating an indicator that indicates healthy operations are detected (block 408). In response to an indication that the MCR % is less than the threshold level during the specified period at block 406, the method 400 includes determining whether a duration for which the MCR % is less than the threshold level during the specified period exceeds an upper limit of a specified window (block 410). In response to an indication that the duration exceeds the upper limit of the specified window at block 410, the method 400 also includes incrementing a cold cycle counter (block 412). Additionally, in response to an indication that the duration does not exceed the upper limit of the specified window at block 410, the method 400 includes determining whether the duration for which the MCR % is less than the threshold level during the specified period is within the specified window (block 414). Within the specified window, as used herein, indicates that a value is equivalent to or less than the upper limit of the specified window or equivalent to or greater than a lower limit of the specified window. In response to an indication that the duration is within the specified window at block 414, the method 400 also includes incrementing a hot cycle counter (block 416). In response to an indication that the duration is not within the specified window at block 414, the method 400 also includes generating an indicator that indicates a short trip or normal shutdown has occurred (block 418).

Starting block 402 includes, but is not limited to, receiving an input from a user, the present system, another system, or a combination thereof, that indicates the present system is to perform the method 400. In a non-limiting example, receiving the sensor data at block 404 includes, but is not limited to receiving the sensor data from one or more computer-readable medium, input devices, network interfaces, or a combination thereof, associated with the present system, another system, or a combination thereof. In a non-limiting example, receiving the sensor data at block 404 includes filtering the sensor data to identify a set of data used by a cyclic load engine of the BHCFM tool. For example, the method 400 may include identifying one or more sets of data of the sensor data that includes one or more flow meter data received by a distributed control system (DCS) of a boiler system, such as flow meter data that indicates a presence of fuel gas flow or steam flow through one or more components of the boiler system.

In a non-limiting example, determining whether the data indicates that an MCR % is less than a threshold level during a specified period at block 406 includes, but is not limited to, determining the MCR %. The MCR % may be determined according to the following equation: MCR %=100*(measured fuel flow at current capacity)/(100% fuel flow according to data sheet). In a non-limiting example, in response to a result of the comparison of the MCR % to the threshold level indicating that the MCR % is not less than the threshold level during the specified period, an indicator is generated indicating that the MCR % is not less than the threshold level during the specified period, and in a response to the result of the comparison indicating that the MCR % is less than the threshold level during the specified period, an indicator is generated indicating that the MCR % is less than the threshold level during the specified period. The specified period may be specified by a manufacturer, an owner, or an operator of the boiler system, for example. The indicator and the MCR % may be outputs of the block 406, for example. In a non-limiting example, in response to an indication that the MCR % is not less than the threshold level during the specified period at block 406, generating the indicator that indicates healthy operations are detected at block 408 includes generating a report that includes one or more of the data associated with block 404, 406.

In a non-limiting example, in response to an indication that the MCR % is less than the threshold level during the specified period, determining whether the duration does not exceed the upper limit of the specified window at block 410 includes determining whether the MCR % is a first MCR % for the specified period. For example, in response to a specified period of a year, determining whether the MCR % is a first MCR % includes determining whether the MCR % is associated with a first day of the year. In non-limiting examples, in response to a determination that the MCR % is the first MCR % for the specified period, a total cycle counter, a cold cycle counter, and a hot cycle counter are reset to zero. In a non-limiting example, in response to a comparison of the duration to the upper limit of the specified window indicating that the duration exceeds the upper limit at block 410, an indicator is generated indicating that a cold cycle is detected, and in a response to the result of the comparison indicating that the duration is equivalent to or less than the upper limit, an indicator is generated indicating that the duration does not exceed the upper limit. In a non-limiting example, the upper limit is 5 hours. In other non-limiting examples, the upper limit is specified by a manufacturer, owner, or operator of the boiler system. The indicator may be an output of the block 410, for example. In a non-limiting example, in response to an indication that the cold cycle is detected at block 410, the cold cycle counter and the total cycle counter are incremented at block 412.

In a non-limiting example, in response to an indication that the duration does not exceed the upper limit at block 410, determining whether the duration for which the MCR % is less than the threshold level during the specified period is within the specified window at block 414 includes comparing the duration to the upper limit and to a lower limit of the specified window. The lower limit is 5 minutes, for example. In other non-limiting examples, the lower limit is specified by a manufacturer, owner, or operator of the boiler system. In a non-limiting example, in response to the comparison indicating that the duration is within the specified window at block 414, an indicator is generated indicating that a hot cycle is detected, and in a response to the result of the comparison indicating that the duration is not within the specified window, an indicator is generated indicating that the duration is not within the specified window. The indicator may be an output of the block 414, for example. In a non-limiting example, in response to an indication that a hot cycle is detected at block 414, the hot cycle counter and the total cycle counter are incremented at block 416. In a non-limiting example, in response to an indication that a hot cycle is not detected at block 414, generating the indicator that a short trip or normal shutdown has occurred at block 418 includes generating a report that includes one or more of the data associated with block 404, 406, 410, 414, the total cycle counter, the hot cycle counter, the cold cycle counter, or a combination thereof. In a non-limiting example, the method 400 may be repeated for each MCR % associated with the specified period.

Figure 5:
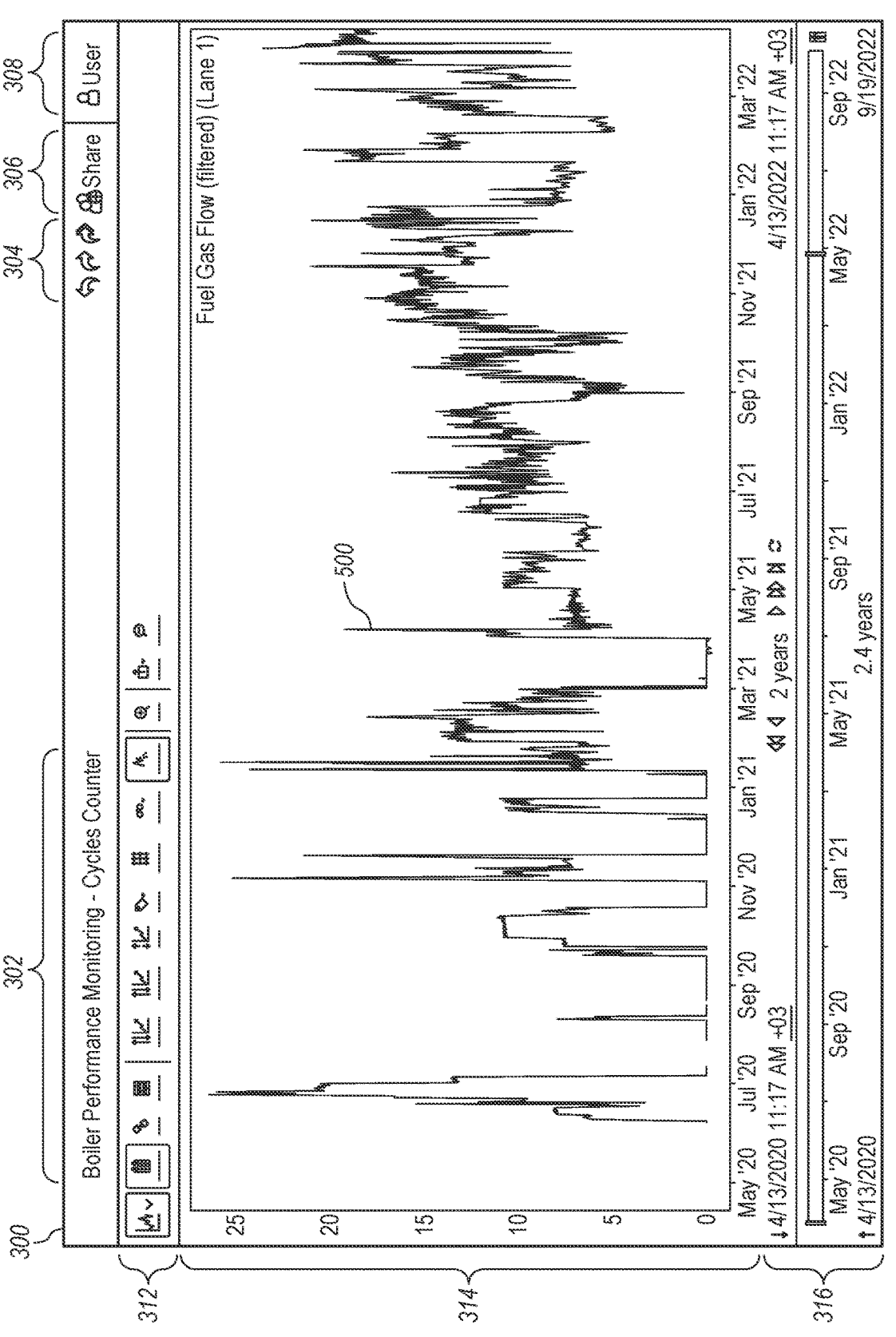
FIG. 5 is a timing diagram of an example output of a BHCFM tool monitoring tube-to-drum joints of a boiler system, in accordance with certain embodiments.

FIG. 5 is a timing diagram 500 of an example output of a BHCFM tool monitoring tube-to-drum joints of a boiler system, in accordance with certain embodiments. In a non-limiting example, the timing diagram 500 is generated by a cyclic load engine of the BHCFM tool as described with respect to FIG. 1, 4, or 11, for example. The timing diagram 500 is displayed in a digital dashboard 300, as described with respect to FIG. 3, for example. In a non-limiting example, the user may select a time period for which to display a fuel gas flow using the timeline interface 316. In response to the selection, the BHCFM tool may retrieve an output of the cyclic load engine that includes a fuel gas flow for each day of the specified time period selected using the timeline interface 316. The BHCFM tool may generate a graphical representation of the output as the timing diagram 500 within the area 314, for example. The timing diagram 500 shows a fuel gas flow for the specified time period, for example. In a non-limiting example, in response to a user selection of a Summary menu option of the menu bar 312, a table displays within the area 314. The table may be a table summarizing one or more outputs of a method used by the cyclic load engine. The method used by the cyclic load engine may be the method 400, for example. The table may include data fields of Table 2, as described with respect to FIG. 1, for example.

Figure 6:
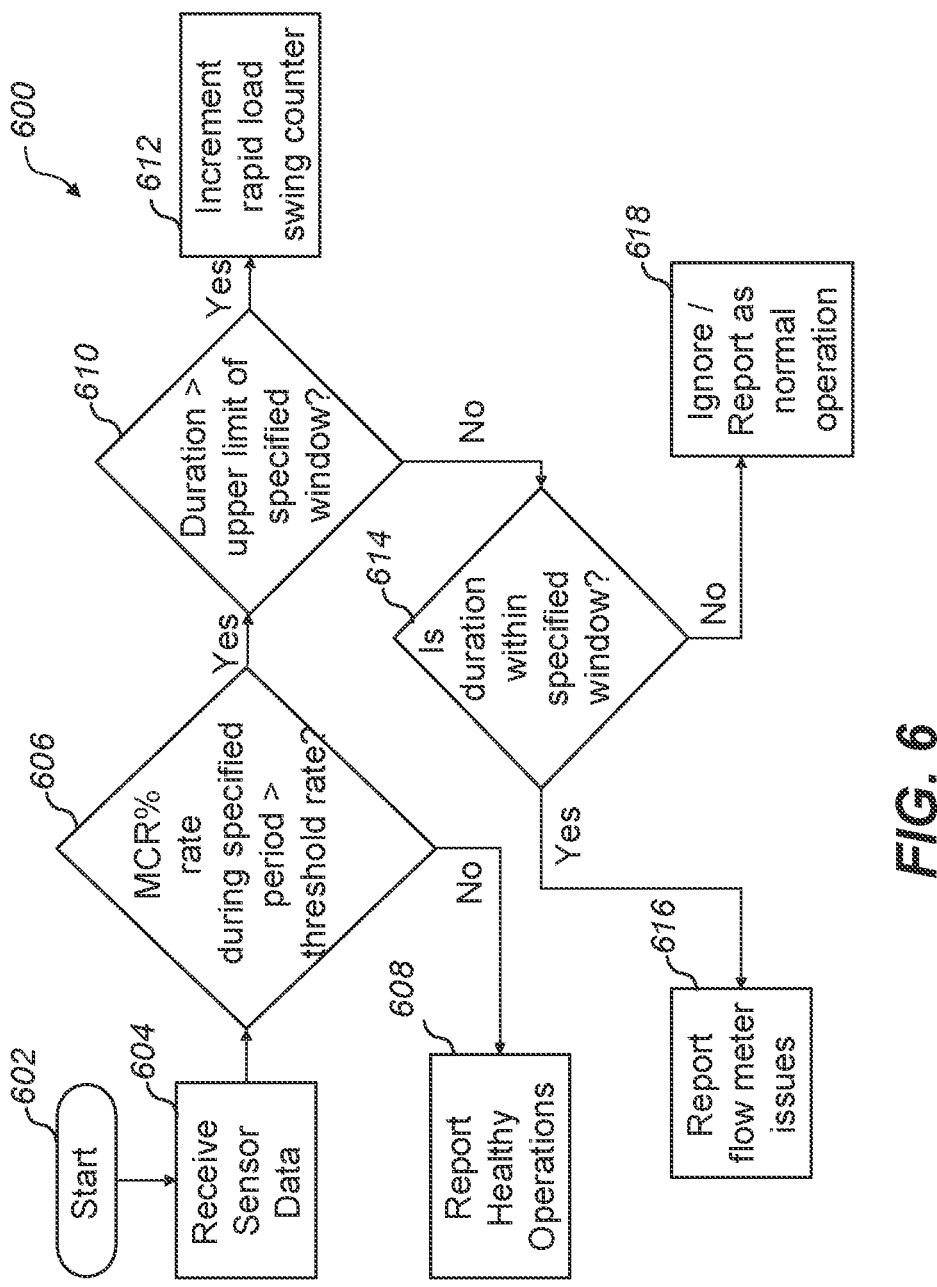
FIG. 6 is a flow diagram of a method for monitoring tube overheating of a boiler system by a BHCFM tool, in accordance with certain embodiments.

FIG. 6 is a flow diagram of a method 600 for monitoring tube overheating of a boiler system by a BHCFM tool, in accordance with certain embodiments. In a non-limiting example, the method 600 is used by a BHCFM tool for generating indicators that provide a status, real-time warnings with corrective actions, or a combination thereof, for one or more components of a boiler system. The method 600 is used by a load swing engine of the BHCFM tool as described with respect to FIG. 1 or 11, for example. The method 600 includes starting (block 602), receiving sensor data (block 604), determining whether the data indicates that a rate of change of an MCR % exceeds a threshold rate during a specified period (block 606), and in response to an indication that the rate of change of the MCR % is equivalent to or less than the threshold rate during the specified period, generating an indicator that indicates healthy operations are detected (block 608). In response to an indication that the rate of change of the MCR % exceeds the threshold rate during the specified period at block 606, the method 600 includes determining whether a duration for which the rate of change of the MCR % exceeds the threshold rate during the specified period exceeds an upper limit of a specified window (block 610). In response to an indication that the duration exceeds the upper limit of the specified window at block 610, the method 600 also includes incrementing a rapid load swing counter (block 612). Additionally, in response to an indication that the duration does not exceed the upper limit of the specified window at block 610, the method 600 includes determining whether the duration for which the rate of change of the MCR % exceeds the threshold rate during the specified period is within the specified window (block 614). In response to an indication that the duration is within the specified window at block 614, the method 600 also includes generating an indicator that indicates detection of flow meter issues (block 616). In response to an indication that the duration is not within the specified window at block 614, the method 600 also includes generating an indicator that indicates normal operators (block 618).

Starting block 602 includes, but is not limited to, receiving an input from a user, the present system, another system, or a combination thereof, that indicates the present system is to perform the method 600. In a non-limiting example, receiving the sensor data at block 604 includes, but is not limited to receiving the sensor data from one or more computer-readable medium, input devices, network interfaces, or a combination thereof, associated with the present system, another system, or a combination thereof. In a non-limiting example, receiving the sensor data at block 604 includes filtering the sensor data to identify a set of data used by a load swing engine of the BHCFM tool. For example, the method 600 may include identifying one or more sets of data of the sensor data that includes one or more flow meter data received by a distributed control system (DCS) of a boiler system, such as flow meter data indicating fuel gas flow through one or more components of the boiler system.

In a non-limiting example, determining whether the data indicates that the rate of change of the MCR % exceeds a threshold rate during a specified period at block 606 includes, but is not limited to, determining the rate of change of the MCR %. The rate of change of the MCR % may be determined according to the following equation:

$$\text{rate of change of MCR } \% = 100 * (\text{current MCR} \% - \text{previous MCR } \%)/(\text{previous MCR } \%),$$

where MCR % is determined according to the equation described with respect to FIG. 4, for example.

In a non-limiting example, in response to a result of the comparison of the rate of change of the MCR % to the threshold rate indicating that the rate of change of the MCR % exceeds the threshold rate during the specified period, an indicator is generated indicating that the rate of change of the MCR % exceeds the threshold rate during the specified period, and in response to the result of the comparison indicating that the rate of change of the MCR % is equivalent to or less than the threshold rate during the specified period, an indicator is generated indicating that the rate of change of the MCR % is equivalent to or less than the threshold level during the specified period. In a non-limiting example, the threshold rate is +/−11%. The specified period may be specified by a manufacturer, an owner, or an operator of the boiler system, for example. The indicator and the rate of change of the MCR % may be outputs of the block 606, for example. In a non-limiting example, in response to an indication that the MCR % is equivalent to or less than the threshold level during the specified period at block 606, generating the indicator that indicates healthy operations are detected at block 608 includes generating a report that includes one or more of the data associated with block 604, 606.

In a non-limiting example, in response to an indication that the rate of change of the MCR % exceeds the threshold level during the specified period, determining whether the duration exceeds the upper limit of the specified window at block 610 includes determining whether the MCR % is a first MCR % for the specified period. For example, in response to a specified period of a year, determining whether the MCR % is a first MCR % includes determining whether the MCR % is associated with a first day of the year. In non-limiting examples, in response to a determination that the MCR % is the first MCR % for the specified period, a rapid load swing counter is reset to zero. In a non-limiting example, in response to a comparison of the duration to the upper limit of the specified window indicating that the duration exceeds the upper limit at block 610, an indicator is generated indicating that a rapid load swing is detected, and in a response to the result of the comparison indicating that the duration is equivalent to or less than the upper limit, an indicator is generated indicating that the duration does not exceed the upper limit. In a non-limiting example, the upper limit is 3 minutes. In other non-limiting examples, the upper limit is specified by a manufacturer, owner, or operator of the boiler system. The indicator may be an output of the block 610, for example. In a non-limiting example, in response to an indication that the rapid load swing is detected at block 610, the rapid load swing counter is incremented at block 612.

In a non-limiting example, in response to an indication that the duration is equivalent to or less than the upper limit at block 610, determining whether the duration for which the rate of change of the MCR % exceeds the threshold rate during the specified period is within the specified window at block 614 includes comparing the duration to the upper limit and to a lower limit of the specified window. The lower limit is 1 minute, for example. In other non-limiting examples, the lower limit is specified by a manufacturer, owner, or operator of the boiler system. In a non-limiting example, in response to the comparison indicating that the duration is within the specified window at block 614, an indicator is generated indicating that a flow meter issue is detected, and in a response to the result of the comparison indicating that the duration is not within the specified window, an indicator is generated indicating that the duration indicates normal operations. The indicator may be an output of the block 614, for example. In a non-limiting example, generating the indicator that a flow meter issue is detected at block 616 includes generating a report that includes one or more of the data associated with block 604, 606, 610, 614, the rapid load swing counter, or a combination thereof. In a non-limiting example, generating the indicator that normal operations are detected at block 618 includes generating a report that includes one or more of the data associated with block 604, 606, 610, 614, the rapid load swing counter, or a combination thereof. In a non-limiting example, the method 600 may be repeated for each rate of change of MCR % associated with the specified period.

Figure 7:
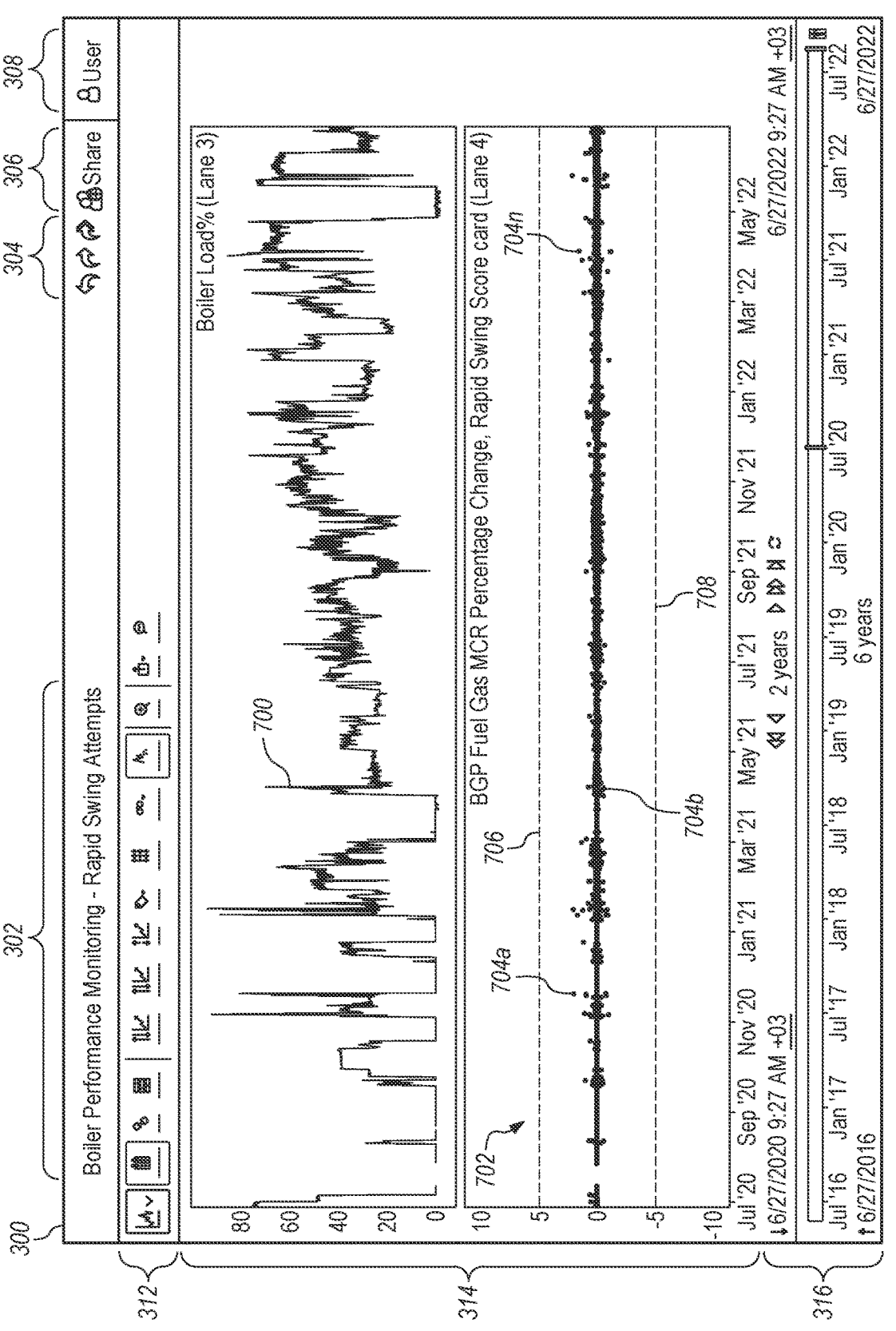
FIG. 7 are timing diagrams of an example output of a BHCFM tool monitoring tube overheating of a boiler system, in accordance with certain embodiments.

FIG. 7 are timing diagrams 700, 702 of an example output of a BHCFM tool monitoring tube overheating of a boiler system, in accordance with certain embodiments. In a non-limiting example, the timing diagrams 700, 702 are generated by a load swing engine of the BHCFM tool as described with respect to FIG. 1, 6, or 11, for example. The timing diagrams 700, 702 are displayed in a digital dashboard 300, as described with respect to FIG. 3, for example. In a non-limiting example, using the timeline interface 316, the user may select a time period for which to display the boiler load percentage and the BGP Fuel Gas MCR % Change. In response to the selection, the BHCFM tool may retrieve one or more outputs of the load swing engine that includes a boiler load percentage and a BGP Fuel Gas MCR % Change for each day of the specified time period selected using the timeline interface 316. The BHCFM tool may generate a graphical representation of the output as the timing diagrams 700, 702, respectively, within the area 314, for example. The timing diagram 700 is a graph of a boiler load percentage. The BHCFM tool generates the timing diagram 700 using fuel flow meter data, for example. The timing diagram 702 is a graph of a BGP Fuel Gas MCR % Change. The timing diagram 702 includes multiple data points 704*a*. 704*b* . . . , 704*n* that represent a different BGP Fuel Gas MCR % Change determined by the load swing engine, for example. In a non-limiting example, the timing diagram 702 includes reference lines 706, 708. The reference lines 706, 708 may indicate an upper limit of a threshold and a lower limit of a threshold, respectively. By calculating the rate of change of MCR % and presenting the timing diagram 702, the BHCFM tool provides a visualization to a user to indicate whether fluctuations of the timing diagram 700 are within a specified tolerance range. In a non-limiting example, in response to a user selection of a Summary menu option of the menu bar 312, a table displays within the area 314. The table may be a table summarizing one or more outputs of a method used by the load swing engine. The method used by the cyclic load engine may be the method 600, for example. The table may include data fields of Table 3, as described with respect to FIG. 1, for example.

Figure 8:
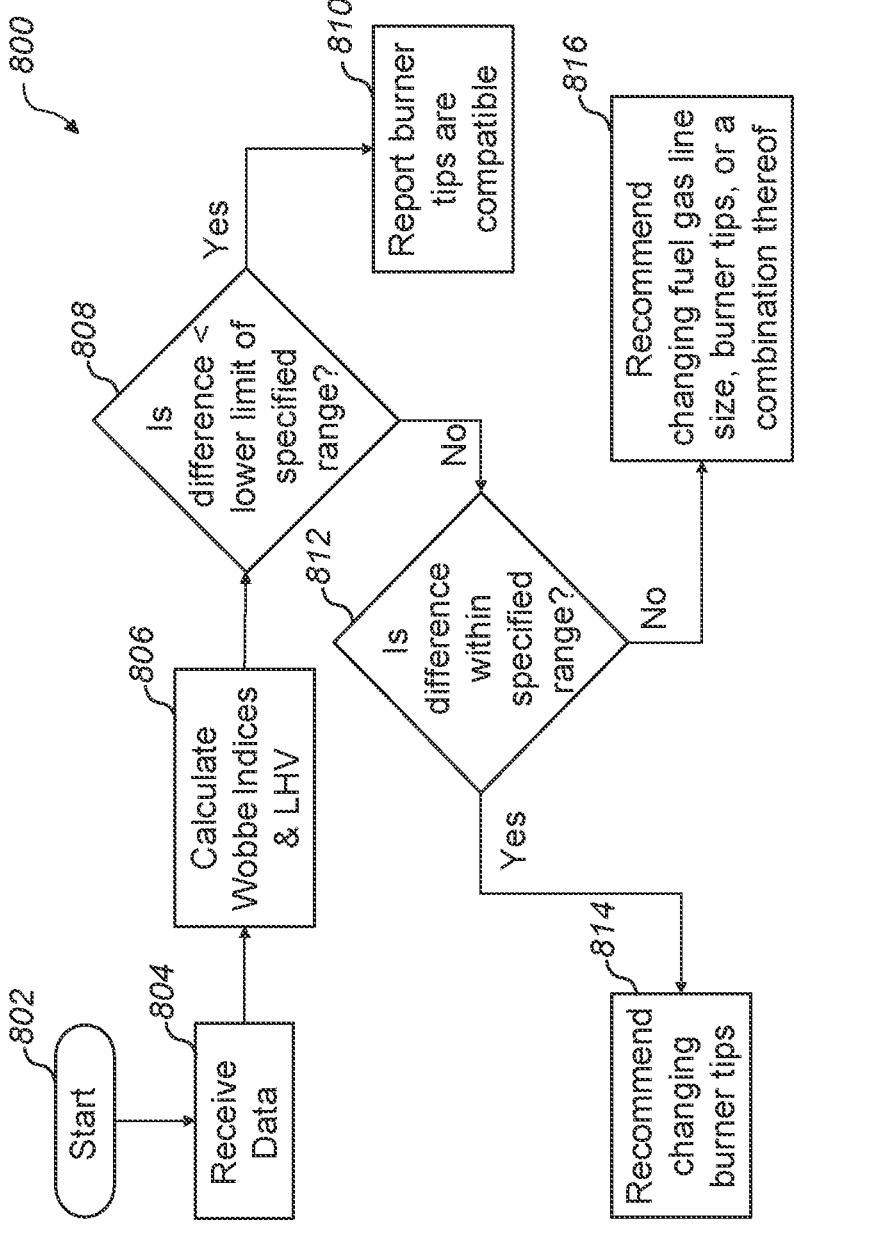
FIG. 8 is a flow diagram of a method for predicting flame disturbance of a boiler system by a BHCFM tool, in accordance with certain embodiments.

FIG. 8 is a flow diagram of a method for predicting flame disturbance of a boiler system by a BHCFM tool, in accordance with certain embodiments. In a non-limiting example, the method 800 is used by a BHCFM tool for generating indicators that provide a status, real-time warnings with corrective actions, or a combination thereof, for one or more components of a boiler system. The method 800 is used by a fuel gas compatibility engine of the BHCFM tool as described with respect to FIG. 1 or 11, for example. The method 800 includes starting (block 802), receiving data (block 804), calculating Wobbe indices and an LHV (block 806), determining whether a difference between a Wobbe index and the LHV is less than a lower limit of a specified range (block 808), and in response to an indication that the difference is less than the lower limit, generating an indicator that indicates burner tips are compatible (block 810). In response to an indication that the difference is equivalent to or greater than the lower limit at block 808, the method 800 includes determining whether the difference is within the specified range (block 812). In response to an indication that the difference is within the specified range at block 812, the method 800 also includes generating an indicator that indicates a recommendation to change burner tips (block 814). Additionally, in response to an indication that the difference is not within the specified range at block 812, the method 800 includes generating an indicator that indicates a recommendation to change fuel gas line size, burner tips, or a combination thereof (block 816).

Starting block 802 includes, but is not limited to, receiving an input from a user, the present system, another system, or a combination thereof, that indicates the present system is to perform the method 800. In a non-limiting example, receiving the data at block 804 includes, but is not limited to receiving the data from one or more computer-readable medium, input devices, network interfaces, or a combination thereof, associated with the present system, another system, or a combination thereof. In a non-limiting example, receiving the data at block 804 includes filtering the data to identify a set of data used by a fuel gas compatibility engine of the BHCFM tool. For example, the method 800 may include identifying one or more sets of data of the data that includes a new fuel composition, a current fuel composition, one or more data associated with data sheets of one or more burners, tips, or a combination thereof, of the boiler system.

In a non-limiting example, calculating the Wobbe indices and an LHV at block 806 includes calculating a Wobbe index for each of a new fuel composition and a current fuel composition, as described with respect to FIG. 1, for example. In a non-limiting example, determining whether a difference between a Wobbe index and the LHV is less than a lower limit of a specified range at block 808 includes determining a difference between values of the Wobbe index for the new fuel composition and the LHV for the current fuel composition and comparing the difference to the lower limit of the specified range. The specified range may be specified by a manufacturer, an owner, or an operator of the boiler system, for example. In a non-limiting example, the lower limit is 11%. In other non-limiting examples, the lower limit is specified by a manufacturer, an owner, or an operator of the boiler system. In a non-limiting example, in response to a result of the comparison indicating that the difference is less than the lower limit, an indicator is generated indicating that the difference is less than the lower limit, and in response to the result of the comparison indicating that the difference is equivalent to or greater than the lower limit, an indicator is generated indicating that the difference is equivalent to or greater than the lower limit. The indicator and the difference may be outputs of the block 808, for example. In response to an indication that the difference is less than the lower limit, generating an indicator that indicates burner tips are compatible at block 810 includes generating a report that includes one or more of the data associated with block 804, 806, 808, or a combination thereof.

In a non-limiting example, in response to the indication that the difference is equivalent to or greater than the lower limit at block 808, determining whether the difference is within the specified range at block 812 includes comparing the difference to an upper limit and to the lower limit of the specified range. In a non-limiting example, the upper limit is 15%. In other non-limiting examples, the upper limit is specified by a manufacturer, an owner, or an operator of the boiler system. In a non-limiting example, in response to the comparison indicating that the difference is within the specified range at block 812, an indicator is generated indicating to generate a recommendation to change burner tips, and in a response to the result of the comparison indicating that the difference is not within the specified range, an indicator is generated indicating to generate a recommendation to change one or more of a new fuel composition, a current fuel composition, one or more fuel gas line sizes, or one or more burner tips. The indicator may be an output of the block 812, for example. In a non-limiting example, generating the recommendation to change burner tips at block 814 includes generating a report that includes one or more of the data associated with block 804, 806, 810, 812. In a non-limiting example, generating the recommendation to change one or more of a new fuel composition, a current fuel composition, one or more fuel gas line sizes, or one or more burner tips at block 816 includes generating a report that includes one or more of the data associated with block 804, 806, 808, 812.

Figure 9:
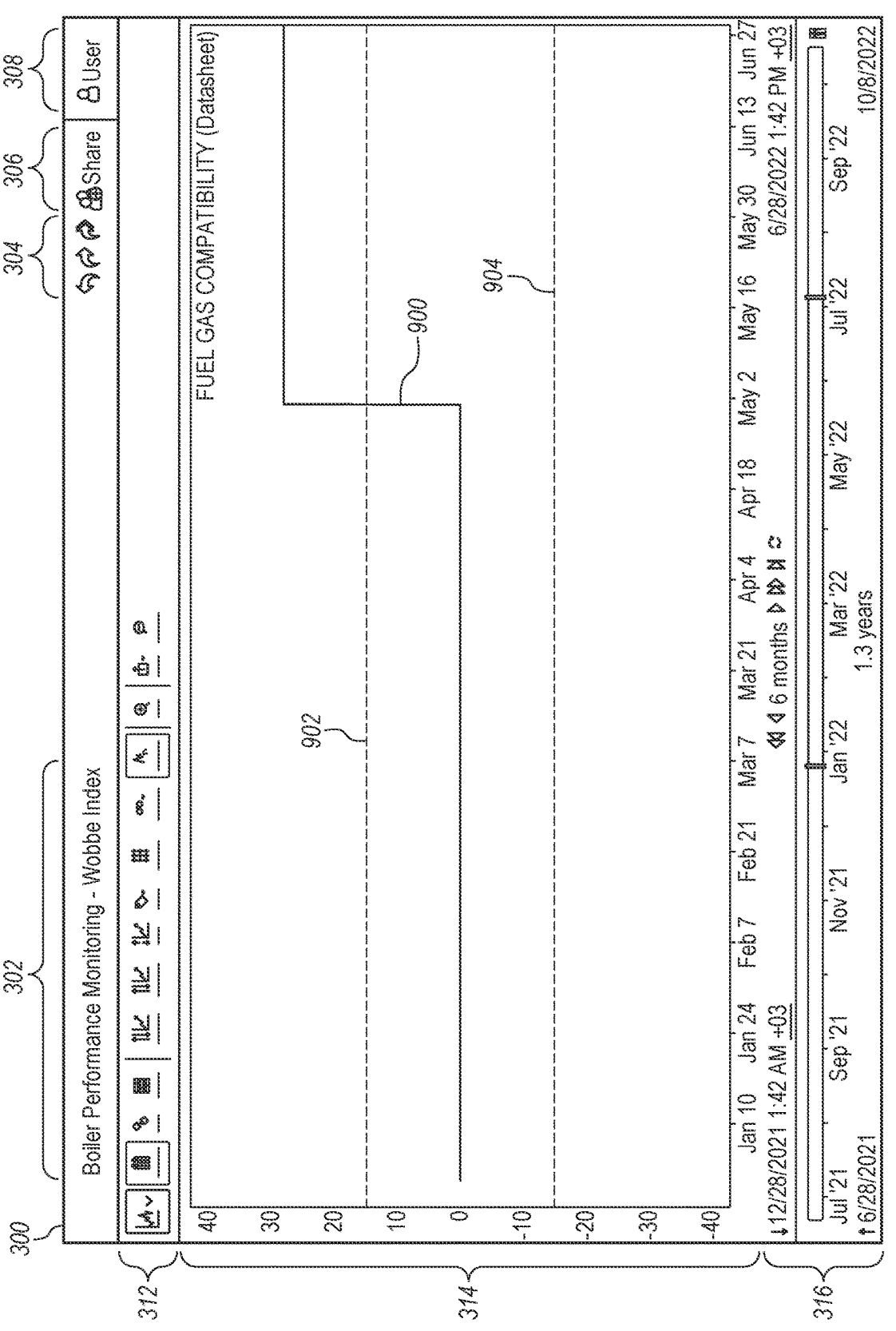
FIG. 9 is a timing diagram of an example output of a BHCFM tool predicting flame disturbance of a boiler system, in accordance with certain embodiments.

FIG. 9 is a timing diagram 900 of an example output of a BHCFM tool for predicting flame disturbance of a boiler system, in accordance with certain embodiments. In a non-limiting example, the timing diagram 900 is generated by a fuel gas compatibility engine of the BHCFM tool as described with respect to FIG. 1, 8, or 11, for example. The timing diagram 900 is displayed in a digital dashboard 300, as described with respect to FIG. 3, for example. In a non-limiting example, the user may select a time period for which to display a fuel gas compatibility verifier using the timeline interface 316. In response to the selection, the BHCFM tool may retrieve an output of the fuel gas compatibility engine that includes a fuel gas compatibility verifier for each day of the specified time period selected using the timeline interface 316. The BHCFM tool may generate a graphical representation of the output as the timing diagram 900 within the area 314, for example. The BHCFM tool may include reference lines 902, 904. The reference lines 902, 904 may indicate an upper limit of a threshold and a lower limit of a threshold, respectively. A transition of the timing diagram 900 from 0 to 30 around May 2 indicates a change in fuel composition that may cause the BHCFM tool to generate recommendations in response to values of the timing diagram 900 exceeding a value indicated by the reference line 902, for example. In a non-limiting example, prior to the transition of the timing diagram 900 around May 2, values of the timing diagram 900 are above the reference line 904 and below the reference line 902, and the BHCFM tool determines that any changes in fuel composition that occur prior to the transition indicate the new fuel gas is compatible.

Figure 10:
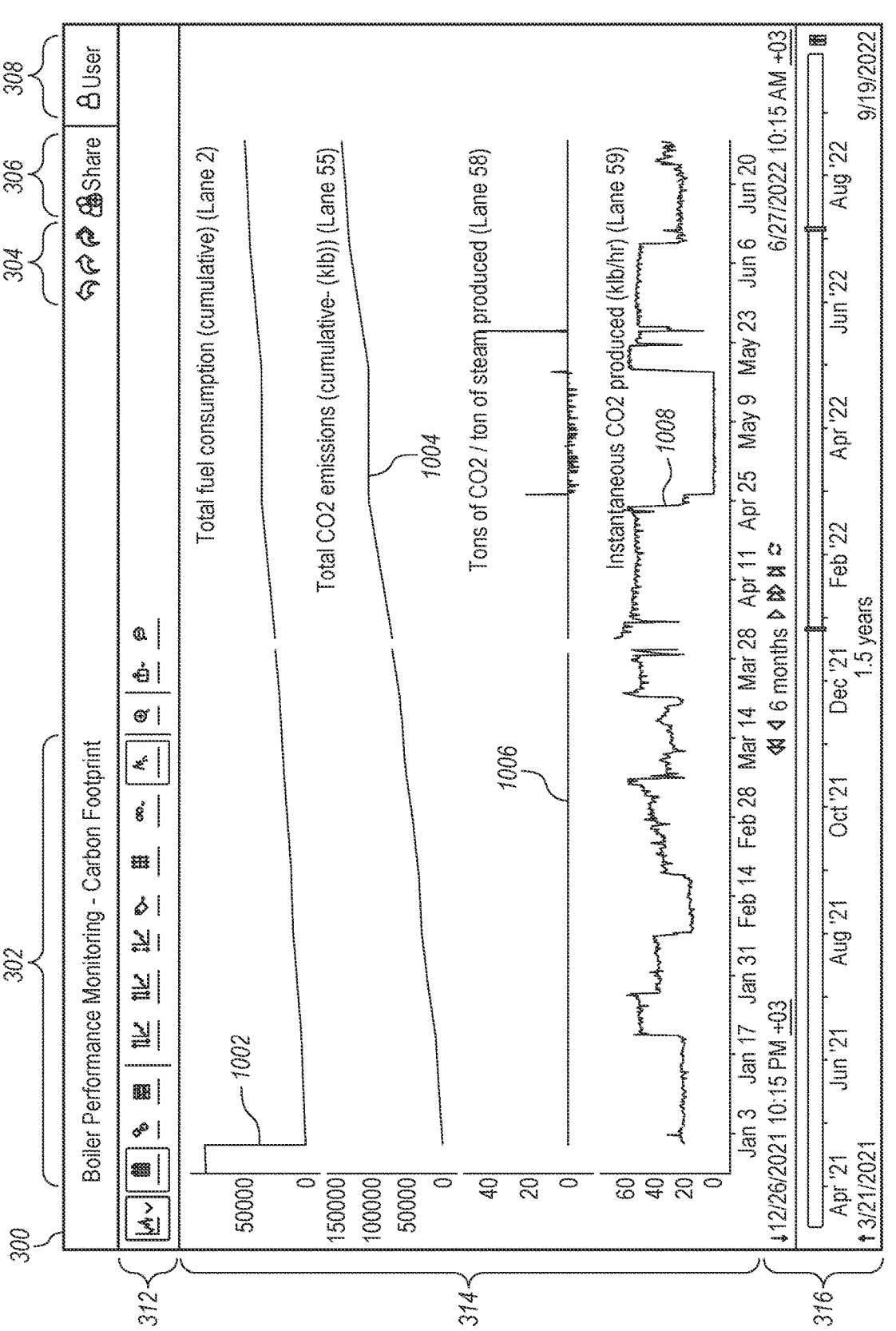
FIG. 10 are timing diagrams of an example output of a BHCFM tool monitoring a carbon footprint of a boiler system, in accordance with certain embodiments.

FIG. 10 are timing diagrams 1002, 1004, 1006, 1008 of an example output of a BHCFM tool monitoring a carbon footprint of a boiler system, in accordance with certain embodiments. In a non-limiting example, the timing diagrams 1002, 1004, 1006, 1008 are generated by a carbon footprint engine of the BHCFM tool as described with respect to FIG. 1 or 11, for example. The timing diagrams 1002, 1004, 1006, 1008 are displayed in a digital dashboard 300, as described with respect to FIG. 3, for example. In a non-limiting example, the user may select a time period for which to display a total fuel consumption, a total $CO_2$ emissions, tons of $CO_2$ per tons of steam produced, and an instantaneous $CO_2$ produced using the timeline interface 316. The total fuel consumption, the total $CO_2$ emissions, or the instantaneous $CO_2$ produced in kilopounds per hour (klbs/hr) may be calculated according to the API 560 standard or a like standard. In a non-limiting example, the tons of $CO_2$ per tons of steam produced may be determined according to the following equation:

$$\text{tons of } CO_2/\text{tons of steam produced} = (CO_2 \text{ emitted*} \\ (3600*\text{Burner Heat Release Rate}))/ \\ (HHV*\text{Steam Flow}),$$

where the steam flow is sensor data (e.g., steam flow meter data), HHV is the higher heating value, CO2 emitted is calculated according to the API 560 standard, and the Burner Heat Release Rate may be determined according to the following equation:

$$\text{Burner Heat Release Rate} = \text{Fuel Flow*HHV},$$

where the fuel flow is sensor data (e.g., fuel flow meter data).

In response to the selection, the BHCFM tool may retrieve an output of the carbon footprint engine that includes a total fuel consumption, a total $CO_2$ emissions, tons of $CO_2$ per tons of steam produced, and an instantaneous $CO_2$ produced for each day of the specified time period selected using the timeline interface 316. The BHCFM tool may generate a graphical representation of the output as the timing diagrams 1002, 1004, 1006, 1008 within the area 314, for example. The timing diagram 1002 is a total fuel consumption for the specified time period, for example. The timing diagram 1004 is a total $CO_2$ emissions for the specified time period, for example. The timing diagram 1006 is a tons of $CO_2$ per tons of steam produced for the specified time period, for example. The timing diagram 1008 shows an instantaneous $CO_2$ for the specified time period, for example.

FIG. 11 is a flow diagram of a method for a BHCFM tool for generating indicators that provide a status, real-time warnings with corrective actions, or a combination thereof, for one or more components of a boiler system, in accordance with certain embodiments. In a non-limiting example, the method 1100 is used by a BHCFM tool for generating indicators that provide a status, real-time warnings with corrective actions, or a combination thereof, for one or more components of a boiler system as described with respect to FIG. 1, 2, 3, 4, 5, 6, 7, 8, 9, or 10, for example. The method 1100 includes starting (block 1102), generating a first indicator (block 1104), generating a second indicator (block 1106), and generating at least one of a third indicator, a fourth indicator, or a fifth indicator (block 1108).

Starting block 1102 includes, but is not limited to, receiving an input from a user, the present system, another system, or a combination thereof, that indicates the present system is to perform the method 1100. In a non-limiting example, starting block 1102 includes, but is not limited to receiving data from one or more computer-readable medium, input devices, network interfaces, or a combination thereof, associated with the present system, another system, or a combination thereof. In a non-limiting example, receiving the data includes filtering the data to identify different sets of data used by the BHCFM tool, as described with respect to FIG. 2, 4, 6, or 8.

In a non-limiting example, generating the first indicator at block 1104 includes generating the first indicator in response to a detection of fuel wastage of a boiler system based on a comparison of data of a first set of data. In a non-limiting example, the method 1100 includes, in response to the detection of the fuel wastage, determining a cause of the fuel wastage, and generating a report including the cause of the fuel wastage. Detecting the fuel wastage of the boiler system may include one or more steps as described with respect to FIG. 1, 2, or 3, for example.

In a non-limiting example, generating the second indicator at block 1106 includes generating the second indicator for monitoring a carbon footprint of the boiler system based on a comparison of data of a second set of data. Monitoring the carbon footprint of the boiler system may include one or more steps as described with respect to FIG. 1 or 10, for example.

In a non-limiting example, generating the third indicator at block 1108 includes generating the third indicator for monitoring the tube-to-drum joints of the boiler system based on a comparison of the data of the first set of data. In a non-limiting example, the method 1100 also includes, in response to generating the second indicator, determining an operational condition for the tube-to-drum joints, and generating a report including the operational conditions. Monitoring the tube-to-drum joints of the boiler system may include one or more steps as described with respect to FIG. 1, 4, or 5, for example.

In a non-limiting example, generating the fourth indicator at block 1108 includes generating the fourth indicator for monitoring tube overheating of the boiler system based on a comparison of the data of the first set of data. In a non-limiting example, the method 1100 also includes, in response to generating the fourth indicator, determining an operational condition for the tubes, and generating a report including the operational conditions. Monitoring the tube overheating of the boiler system may include one or more steps as described with respect to FIG. 1, 6, or 7, for example.

In a non-limiting example, generating the fifth indicator at block 1108 includes generating the fifth indicator for predicting a flame disturbance of the boiler system based on a comparison of data of a third set of data. In a non-limiting example, the method 1100 includes, in response to generating the fifth indicator, calculating Wobbe indices for a new fuel composition and a current fuel composition, determining whether a difference between the Wobbe index for the new fuel composition and a lower heating value for the current fuel composition is within a specified range, and generating a recommendation based on the determination. Predicting the flame disturbance of the boiler system may include one or more steps as described with respect to FIG. 1, 8, or 9, for example.

The blocks of the method 200, 400, 600, 800, 1100 may be executed by one or multiple computer applications. The blocks of the method 200, 400, 600, 800, 1100 may be executed in any order, and in any combination, except where logic dictates otherwise, and may individually be executed one or more times. As a non-limiting example, block 204 may be executed six (6) times followed by one (3) executions of block 206, followed by executions of block 210 two (2) times then executions of block 214 two (2) times, block 218 one (1) time, and block 220 one (1) time. Executing a block multiple times may ensure an accuracy of data, a repeatability of a determination, or a combination thereof, thereby increasing an accuracy and reliability of outputs of the method 200, 400, 600, 800, 1100.

System 100 and method 200, 400, 600, 800, 1100 may each be partially or wholly implemented, in any combination, as part of a BHCFM tool or multiple BHCFM tools used by one or more organizations for generating indicators that provide a status, real-time warnings with corrective actions, or a combination thereof, for one or more components of a boiler system. While the examples described herein refer to a single organization, one skilled in the art will recognize that the BHCFM tool described herein may provide services to multiple organizations. In a non-limiting example, multiple user systems from multiple organizations may transmit data to the BHCFM tool via multiple interfaces. The BHCFM tool may include multiple storage devices, one or more for each organization of the multiple organizations. Processing sensor data may include identifying an organization associated with the sensor data. The BHCFM tool may use the organization identifier to determine relevant specified parameters (e.g., rates, time windows, time limits, periods, threshold levels, tolerances, ranges, categorizations) to use in processing the sensor data, a storage device to use in processing the sensor data or outputting results of the BHCFM tool, a display device to use in outputting the indicators, or a combination thereof. The specified parameters may be stored to the storage device associated with the organization, for example.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 12. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 125 U.S.C. § 101 (such as a propagating electrical or electromagnetic signal per se). As an example and not by way of limitation, a computer-readable storage media may include a semiconductor-based circuit or device or other IC (such as, for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions specified in the flowchart block or blocks.

Figure 12:
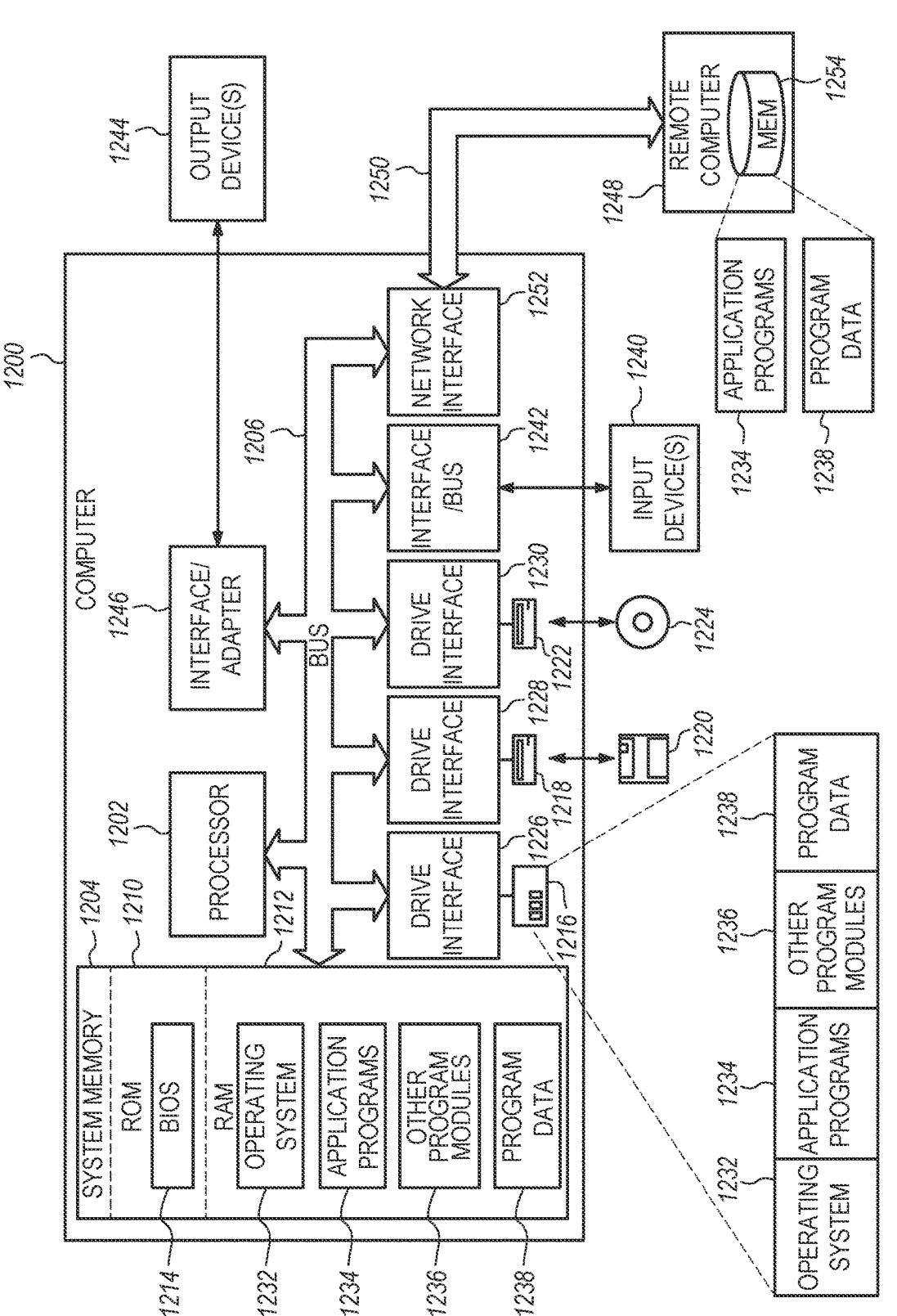
FIG. 12 is a block diagram of a computer system that can be employed to execute a BHCFM tool, in accordance with certain embodiments.

FIG. 12 is a block diagram of a computer system that can be employed to execute a system for analyzing ransomware threat intelligence in accordance with certain embodiments described. Computer system 1200 can be implemented on one or more general purpose networked computer systems, embedded computer systems, routers, switches, server devices, client devices, various intermediate devices/nodes or standalone computer systems. Additionally, computer system 1200 can be implemented on various mobile clients such as, for example, a personal digital assistant (PDA), laptop computer, pager, and the like, provided it includes sufficient processing capabilities.

Computer system 1200 includes processing unit 1202, system memory 1204, and system bus 1206 that couples various system components, including the system memory 1204, to processing unit 1202. Dual microprocessors and other multi-processor architectures also can be used as processing unit 1202. System bus 1206 may be any of several types of bus structure including a memory bus or memory controller, a peripheral bus, and a local bus using any of a variety of bus architectures. System memory 1204 includes read only memory (ROM) 1210 and random access memory (RAM) 1212. A basic input/output system (BIOS) 1214 can reside in ROM 1210 containing the basic routines that help to transfer information among elements within computer system 1200.

Computer system 1200 can include a hard disk drive 1216, magnetic disk drive 1218, e.g., to read from or write to removable disk 1220, and an optical disk drive 1222, e.g., for reading CD-ROM disk 1224 or to read from or write to other optical media. Hard disk drive 1216, magnetic disk drive 1218, and optical disk drive 1222 are connected to system bus 1206 by a hard disk drive interface 1226, a magnetic disk drive interface 1228, and an optical drive interface 1230, respectively. The drives and associated computer-readable media provide nonvolatile storage of data, data structures, and computer-executable instructions for computer system 1200. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 1212, including operating system 1232, one or more computer application programs 1234, other program modules 1236, and program data 1238. In some examples, the computer application programs 1234 can include one or more sets of computer-executable instructions of the BHCFM tool 102 and one or more sets of computer-executable instructions of the boiler system 104 and the program data 1238 can include the data stored to the storage device 106. The computer application programs 1234 and program data 1238 can include functions and methods programmed to perform the methods 200, 400, 600, 800, 1100 to provide a BHCFM tool for monitoring failure indicators, detecting fuel wastage, and determining a carbon footprint of a boiler system, such as shown and described herein.

A user may enter commands and information into computer system 1200 through one or more input devices 1240, such as a pointing device (e.g., a mouse, touch screen), keyboard, microphone, joystick, game pad, scanner, and the like. For instance, the user can employ input device 1240 to edit or modify the BHCFM tool 102, the boiler system 104, or data stored to the storage device 106. These and other input devices 1240 are often connected to processing unit 1202 through a corresponding port interface 1242 that is coupled to the system bus, but may be connected by other interfaces, such as a parallel port, serial port, or universal serial bus (USB). One or more output devices 1244 (e.g., display, a monitor, printer, projector, or other type of displaying device) is also connected to system bus 1206 via interface 1246, such as a video adapter. An output device 1244 may be the display device 108 in a non-limiting example.

Computer system 1200 may operate in a networked environment using logical connections to one or more remote computers, such as remote computer 1248. Remote computer 1248 may be a workstation, computer system, router, peer device, or other common network node, and typically includes many or all the elements described relative to computer system 1200. The logical connections, schematically indicated at 1250, can include a local area network (LAN) and a wide area network (WAN). When used in a LAN networking environment, computer system 1200 can be connected to the local network through a network interface or adapter 1252. When used in a WAN networking environment, computer system 1200 can include a modem, or can be connected to a communications server on the LAN. The modem, which may be internal or external, can be connected to system bus 1206 via an appropriate port interface. In a networked environment, computer application programs 1234 or program data 1238 depicted relative to computer system 1200, or portions thereof, may be stored in a remote memory storage device 1254.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, blocks, operations, elements, and/or components, but do not preclude the presence or addition of one or more other features, integers, blocks, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the description has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the description without departing from the essential scope thereof. Therefore, it is intended that the invention not be limited to the particular embodiments described, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A boiler health and carbon-footprint monitor (BHCFM) tool, comprising:
a sensor system configured to collect operational data from a boiler system;
a fuel wastage engine, implemented by at least one processor operatively coupled to the sensor system, configured to generate a first indicator for monitoring fuel wastage of the boiler system based on a first comparison of the operational data, determine a cause of the fuel wastage by analyzing variations in air-to-fuel ratios based on the operational data, and generate a notification including the cause of the fuel wastage and operational recommendations for correcting the fuel wastage;
a carbon footprint engine, implemented by the at least one processor operatively coupled to the sensor system, configured to generate a second indicator for monitoring a carbon footprint of the boiler system based on the operational data using an actual fuel composition and a real-time firing rate to provide real-time environmental impact monitoring;
a cyclic load engine, implemented by the at least one processor operatively coupled to the sensor system, configured to generate a third indicator for monitoring tube-to-drum joints of the boiler system based on thermal cycle analysis of the operational data, determine an operational condition for the tube-to-drum joints by analyzing thermal cycle data, and generate a notification including the operational conditions and operational recommendations for maintaining tube-to-drum joint integrity;
a load swing engine, implemented by the at least one processor operatively coupled to the sensor system, configured to generate a fourth indicator for monitoring tube overheating of the boiler system based on a third comparison of the operational data, determine an operational condition for one or more tubes of the boiler system, and generate a notification including the operational conditions and operational recommendations for preventing tube overheating; and
a fuel gas compatibility engine, implemented by the at least one processor operatively coupled to the sensor system, configured to generate a fifth indicator for predicting flame disturbance of the boiler system based on operational data including a fuel composition and burner data, calculate Wobbe indices for a new fuel composition and a current fuel composition, determine whether a difference between the Wobbe index for the new fuel composition and a lower heating value for the current fuel composition is within a specified range, and generate operational recommendations based on the determination for maintaining flame stability.

2. The BHCFM tool of claim 1, wherein the operation data includes fuel composition and burner data, and wherein the sensor system includes sensors configured to measure the fuel composition and monitor burner operational parameters.

3. The BHCFM tool of claim 2, wherein the fuel wastage engine, the cyclic load engine, the load swing engine, the carbon footprint engine, and the fuel gas compatibility engine are each operatively coupled to the sensor system and configured to generate a report that includes data related to the first indicator, the second indicator, the third indicator, the fourth indicator, and the fifth indicator, respectively, wherein the reports include operational recommendations for optimizing boiler performance based on the respective indicators.

4. The BHCFM tool of claim 2, wherein the operational data includes a fuel composition and burner data, and wherein the sensor system includes sensors configured to measure the fuel composition and monitor burner operational parameters.

5. The BHCFM tool of claim 1, wherein the operational data includes a fuel flow and a steam flow from the sensor system, and wherein the carbon footprint engine uses a fuel composition and a real-time firing rate from the operational data to generate the second indicator.

6. A method for monitoring a boiler health and carbon footprint, comprising:

collecting operational data from a boiler system via a sensor system including temperature gauges, flow meters, and pressure sensors;

generating a first indicator in response to a detection of fuel wastage of the boiler system based on analyzing variations in air-to-fuel ratios from the operational data, and in response to the detection of the fuel wastage, determining a cause of the fuel wastage and generating a notification including the cause of the fuel wastage and operational recommendations for correcting the fuel wastage;

generating a second indicator for monitoring a carbon footprint of the boiler system based on the operational data using an actual fuel composition and a real-time firing rate to provide real-time environmental impact monitoring;

generating a third indicator for monitoring tube-to-drum joints of the boiler system based on thermal cycle analysis of the operational data, and in response to generating the third indicator, determining an operational condition for the tube-to-drum joints by analyzing thermal cycle data and generating a notification including the operational conditions and operational recommendations for maintaining tube-to-drum joint integrity;

generating a fourth indicator for monitoring tube overheating of the boiler system based on analyzing rate of change data from the operational data, and in response to generating the fourth indicator, determining an operational condition for one or more tubes of the boiler system and generating a notification including the operational conditions and operational recommendations for preventing tube overheating; and generating a fifth indicator for predicting flame disturbance of the boiler system based on the operational data including a fuel composition and burner data, and in response to generating the fifth indicator, calculating Wobbe indices for a new fuel composition and a current fuel composition, determining whether a difference between the Wobbe index for the new fuel composition and a lower heating value for the current fuel composition is within a specified range, and generating operational recommendations based on the determination for maintaining flame stability.

7. The method of claim 6, wherein the collecting operational data includes receiving real-time measurements from the temperature gauges, flow meters, and pressure sensors positioned throughout the boiler system, the method further comprising:

in response to the detection of the fuel wastage, determining a cause of the fuel wastage by analyzing variations in air-to-fuel ratios based on the operational data; and generating a notification including the cause of the fuel wastage and operational recommendations for correcting the fuel wastage.

8. The method of claim 6, wherein the collecting operational data includes receiving real-time measurements from the temperature gauges, flow meters, and pressure sensors positioned throughout the boiler system, the method further comprising:

in response to generating the third indicator, determining an operational condition for the tube-to-drum joints by analyzing thermal cycle data from the operational data; and generating a notification including the operational conditions and operational recommendations for maintaining tube-to-drum joint integrity.

9. The method of claim 6, further comprising: in response to generating the fourth indicator, determining an operational condition for one or more tubes of the boiler system; and generating a notification including the operational conditions.

10. The method of claim 6, further comprising: in response to generating the fifth indicator, calculating Wobbe indices for a new fuel composition and a current fuel composition; determining whether a difference between the Wobbe index for the new fuel composition and a lower heating value for the current fuel composition is within a specified range; and generating a recommendation based on the determination.

11. A non-transitory computer-readable medium storing computer-executable instructions, which, when executed by a processor operatively coupled to a sensor system configured to collect operational data from a boiler system, cause the processor to:

generate a first indicator in response to a detection of fuel wastage of the boiler system based on a first comparison of the operational data, and determine a cause of the fuel wastage and generate a notification including the cause of the fuel wastage;

generate a second indicator for monitoring a carbon footprint of the boiler system based on the operational data using an actual fuel composition and a real-time firing rate;

generate a third indicator for monitoring tube-to-drum joints of the boiler system based on a second comparison of the operational data, and determine an operational condition for the tube-to-drum joints and generate a notification including the operational conditions;

generate a fourth indicator for monitoring tube overheating of the boiler system based on a third comparison of the operational data, and determine an operational condition for one or more tubes of the boiler system and generate a notification including the operational conditions; and generate a fifth indicator for predicting flame disturbance of the boiler system based on the operational data including a fuel composition and burner data, and calculate Wobbe indices for a new fuel composition and a current fuel composition, determine whether a difference between the Wobbe index for the new fuel composition and a lower heating value for the current fuel composition is within a specified range, and generate a recommendation based on the determination.

12. The non-transitory computer-readable medium of claim 11, wherein the processor is operatively coupled to the sensor system including temperature gauges, flow meters, and pressure sensors positioned throughout the boiler system, and wherein the processor is operable to:

in response to the detection of the fuel wastage, determine a cause of the fuel wastage by analyzing variations in air-to-fuel ratios based on the operational data; and generate a notification including the cause of the fuel wastage and operational recommendations for correcting the fuel wastage.

13. The non-transitory computer-readable medium of claim 12, wherein the processor is operable to:

in response to generating the third indicator, determine an operational condition for the tube-to-drum joints by analyzing thermal cycle data from the operational data; and generate a notification including the operational conditions and operational recommendations for maintaining tube-to-drum joint integrity.

14. The non-transitory computer-readable medium of claim 13, wherein the processor is operable to:

in response to generating the fourth indicator, determine an operational condition for one or more tubes; and generate a report including the operational conditions.

15. The non-transitory computer-readable medium of claim 11, wherein the processor is operable to:

in response to generating the fifth indicator, calculate Wobbe indices for a new fuel composition and a current fuel composition;

determine whether a difference between a Wobbe index for the new fuel composition and a lower heating value for the current fuel composition is within a specified range; and generate a recommendation based on the determination.

* * * * *